(12) United States Patent
Milstein et al.

(10) Patent No.: US 11,430,434 B1
(45) Date of Patent: Aug. 30, 2022

(54) INTELLIGENT PRIVACY PROTECTION MEDIATION

(71) Applicant: Amazon Technologies, Inc., Seattle, WA (US)

(72) Inventors: David Milstein, Redmond, WA (US); Brian Alexander Oliver, Seattle, WA (US); Christopher Schindler, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 249 days.

(21) Appl. No.: 15/433,417

(22) Filed: Feb. 15, 2017

(51) Int. Cl.
| | |
|---|---|
| *G06F 21/60* | (2013.01) |
| *G10L 15/22* | (2006.01) |
| *G10L 15/30* | (2013.01) |
| *G10L 15/08* | (2006.01) |
| G10L 15/14 | (2006.01) |
| G10L 15/16 | (2006.01) |
| G10L 15/18 | (2013.01) |
| H04L 67/306 | (2022.01) |

(52) U.S. Cl.
CPC ............. *G10L 15/22* (2013.01); *G10L 15/08* (2013.01); *G10L 15/30* (2013.01); *G10L 15/142* (2013.01); *G10L 15/16* (2013.01); *G10L 15/18* (2013.01); *G10L 2015/088* (2013.01); *G10L 2015/223* (2013.01); *G10L 2015/227* (2013.01); *H04L 67/306* (2013.01)

(58) Field of Classification Search
CPC ......... G10L 15/20; G10L 15/08; G10L 17/00; G10L 2015/223; G10L 2015/227; H04L 67/306; H04L 63/08
See application file for complete search history.

(56) References Cited

U.S. PATENT DOCUMENTS

| | | | | |
|---|---|---|---|---|
| 9,147,054 | B1 * | 9/2015 | Beal | G06F 21/32 |
| 9,147,399 | B1 * | 9/2015 | Hart | G10L 17/08 |
| 9,361,481 | B2 * | 6/2016 | LaFever | G06F 21/6218 |
| 9,443,514 | B1 * | 9/2016 | Taubman | G10L 15/22 |
| 9,490,976 | B2 * | 11/2016 | Ladak | H04L 9/0861 |
| 9,860,226 | B2 * | 1/2018 | Thormaehlen | H04W 12/02 |
| 10,026,401 | B1 * | 7/2018 | Mutagi | G10L 15/22 |
| 10,417,445 | B2 * | 9/2019 | Wouhaybi | H04W 4/02 |
| 10,952,014 | B2 * | 3/2021 | Yang | G06K 9/0063 |

(Continued)

*Primary Examiner* — Olujimi A Adesanya
(74) *Attorney, Agent, or Firm* — Pierce Atwood LLP

(57) ABSTRACT

Systems, methods, and devices for privacy protection and user data obfuscation are disclosed. A speech-controlled device captures audio including a spoken command, and sends audio data corresponding thereto to a server(s). The server(s) 120 determines a user that spoke the command. The server(s) also determines, based on a profile of the user, user data (e.g., age, geographic location, etc.). The server(s) determines user group data encompassing the user data (e.g., including an age range encompassing the user's age, a geographic area encompassing the user geographic location, etc.). The server(s) determines a remote device(s) storing or having access to content responsive to the spoken command. The server(s) sends the user group data to the remote device(s), receives output content responsive to the spoken command and tailored to the user group data from the remote device(s), and causes the speech-controlled device to emit the output content.

20 Claims, 19 Drawing Sheets

(56) References Cited

U.S. PATENT DOCUMENTS

| | | | |
|---|---|---|---|
| 2003/0185358 A1* | 10/2003 | Sakamoto | G10L 15/26 379/102.01 |
| 2004/0015714 A1* | 1/2004 | Abraham | G06Q 20/3821 726/4 |
| 2004/0054574 A1* | 3/2004 | Kaufman | G06Q 30/02 705/14.56 |
| 2008/0005264 A1* | 1/2008 | Brunell | H04L 63/0407 709/217 |
| 2010/0146583 A1* | 6/2010 | Prehofer | G06Q 10/10 726/1 |
| 2010/0257577 A1* | 10/2010 | Grandison | G06Q 50/01 726/1 |
| 2010/0268412 A1* | 10/2010 | Mori | B60W 10/30 701/31.4 |
| 2010/0312547 A1* | 12/2010 | Van Os | G10L 15/26 704/9 |
| 2011/0126290 A1* | 5/2011 | Krishnamurthy | G06F 21/577 726/26 |
| 2011/0135071 A1* | 6/2011 | Milstein | G06F 17/2872 379/88.14 |
| 2011/0238829 A1* | 9/2011 | Brunell | G06F 21/6263 709/224 |
| 2013/0086225 A1* | 4/2013 | Gay | H04L 63/0407 709/219 |
| 2013/0297422 A1* | 11/2013 | Hunter | H04W 4/023 705/14.58 |
| 2013/0298247 A1* | 11/2013 | Laurila | G06F 21/6245 726/26 |
| 2014/0059695 A1* | 2/2014 | Parecki | H04W 12/08 726/26 |
| 2014/0096261 A1* | 4/2014 | Boldyrev | G06F 21/00 726/26 |
| 2014/0172953 A1* | 6/2014 | Blanksteen | H04W 4/02 709/203 |
| 2015/0039427 A1* | 2/2015 | Elbouchikhi | G06Q 30/0255 705/14.53 |
| 2015/0235642 A1* | 8/2015 | Nishikawa | G10L 17/00 704/249 |
| 2015/0281449 A1* | 10/2015 | Milstein | H04M 3/4872 379/265.09 |
| 2015/0302857 A1* | 10/2015 | Yamada | G10L 15/22 704/275 |
| 2015/0310483 A1* | 10/2015 | Kent | G06Q 30/0246 705/14.45 |
| 2015/0356317 A1* | 12/2015 | Ukil | G06F 21/6245 726/28 |
| 2015/0379989 A1* | 12/2015 | Balasubramanian | G06Q 30/0255 704/233 |
| 2016/0026802 A1* | 1/2016 | Krishnamurthy | G06F 21/577 726/27 |
| 2017/0169819 A1* | 6/2017 | Mese | G10L 15/22 |
| 2017/0242653 A1* | 8/2017 | Lang | H04S 7/301 |
| 2018/0047394 A1* | 2/2018 | Tian | G10L 15/24 |
| 2019/0182218 A1* | 6/2019 | Tidwell | G06F 21/6254 |

* cited by examiner

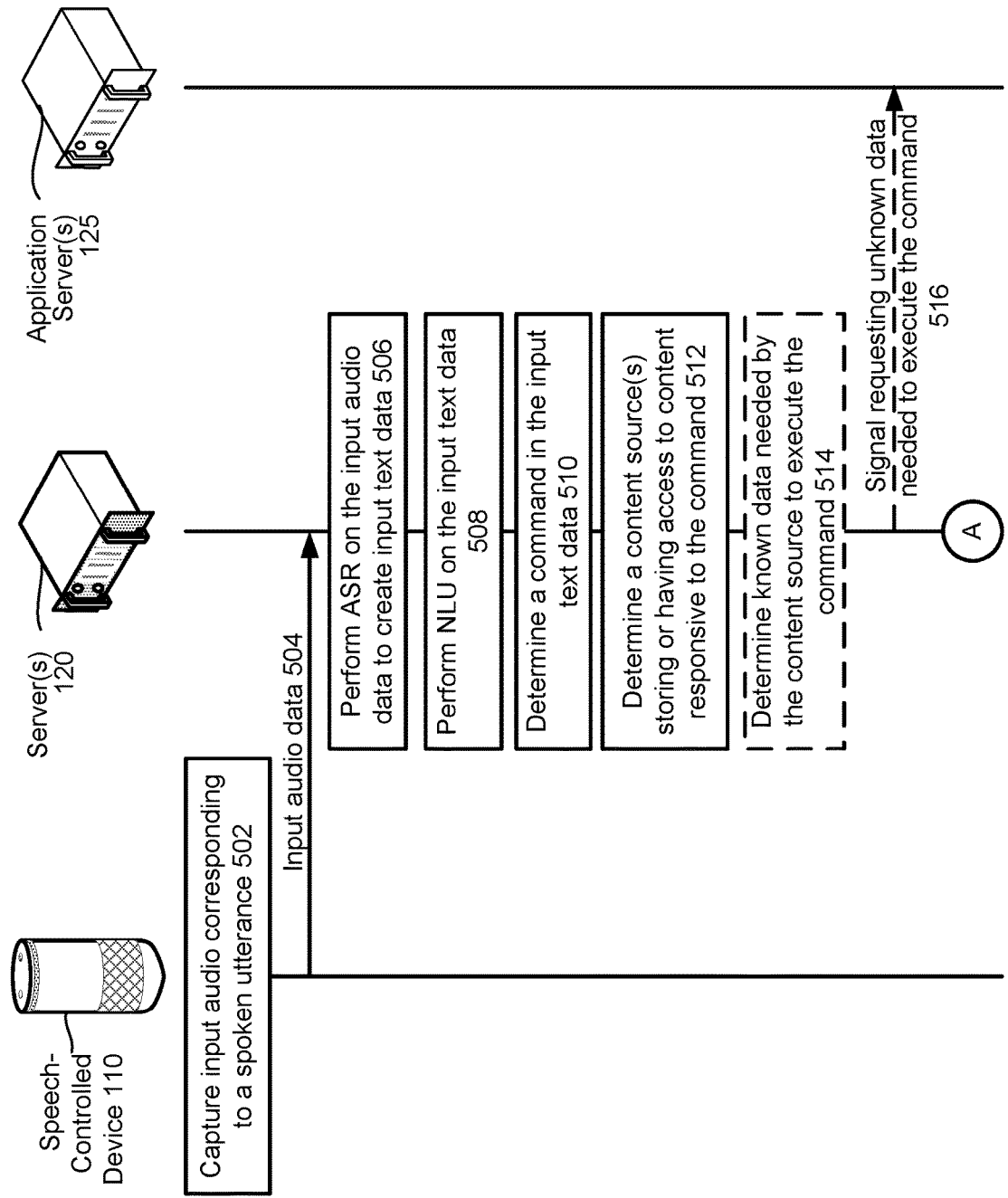

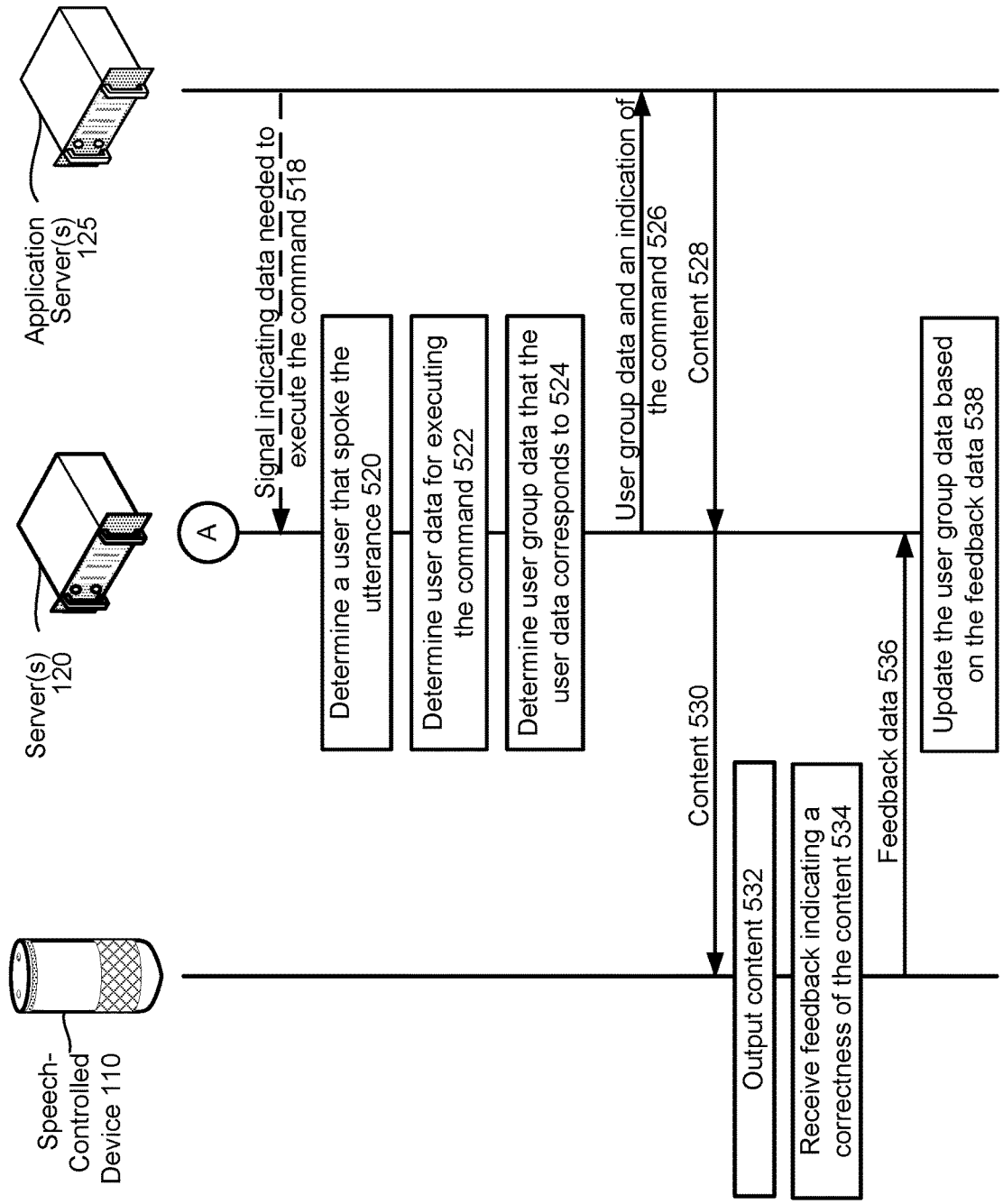

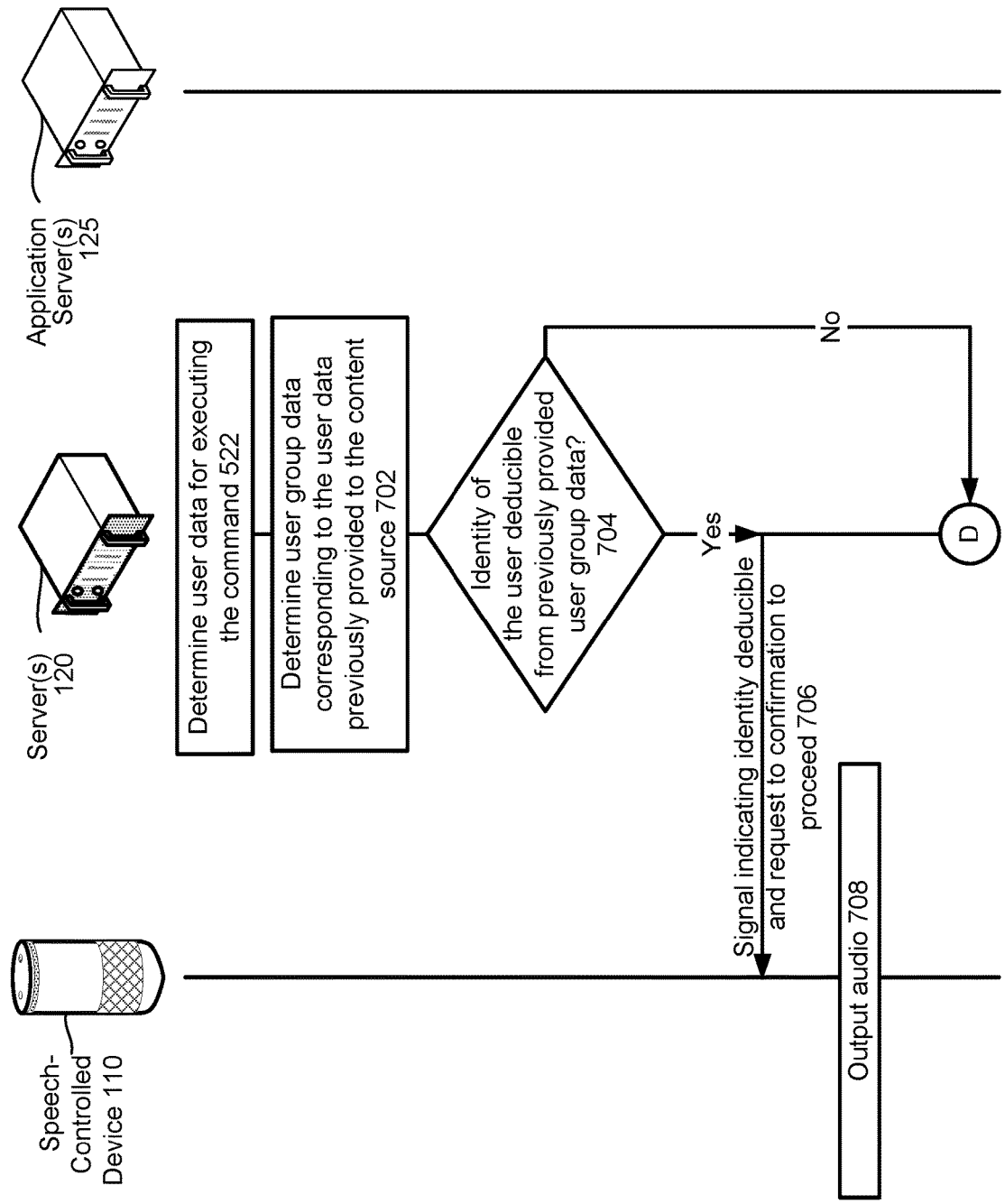

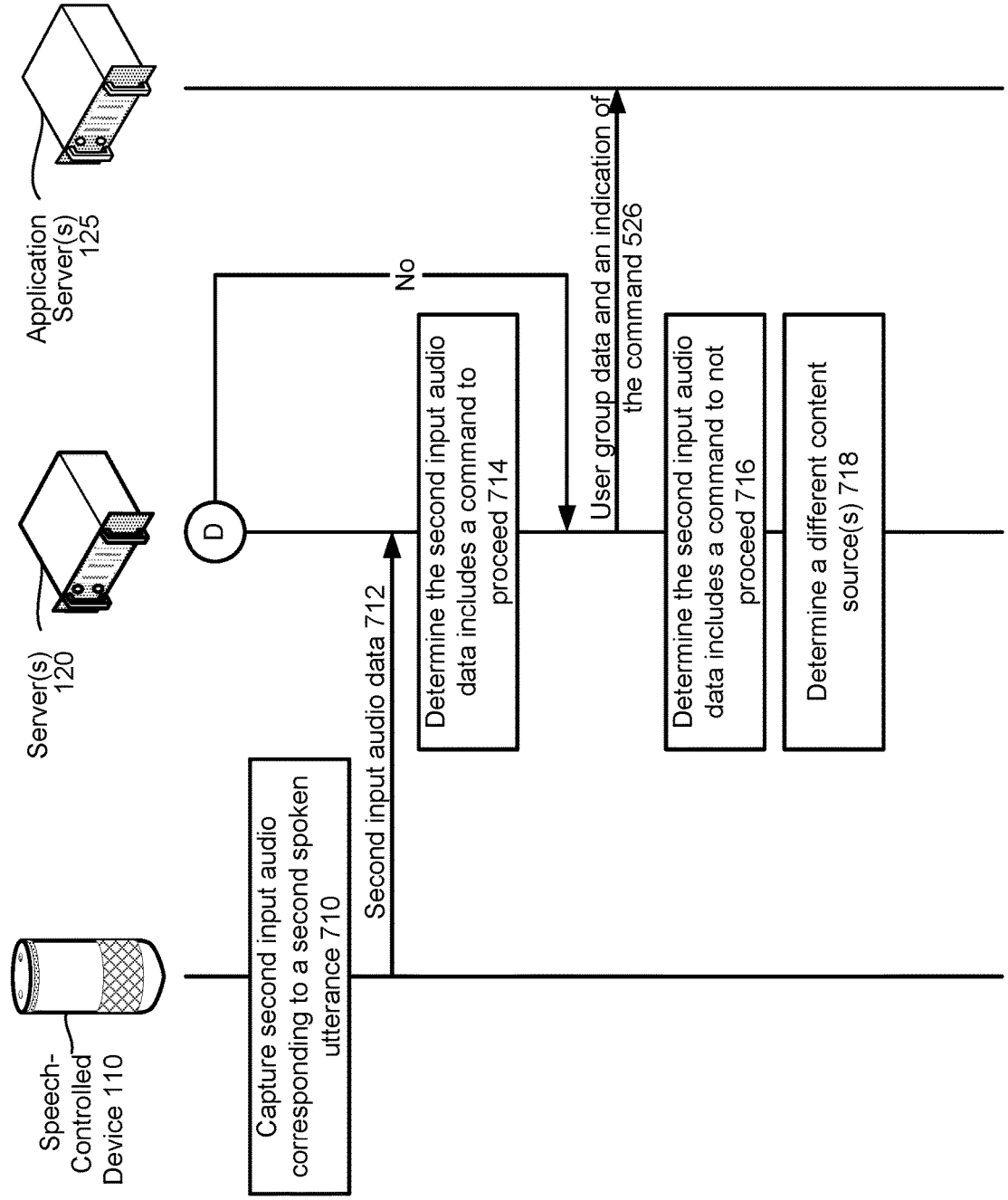

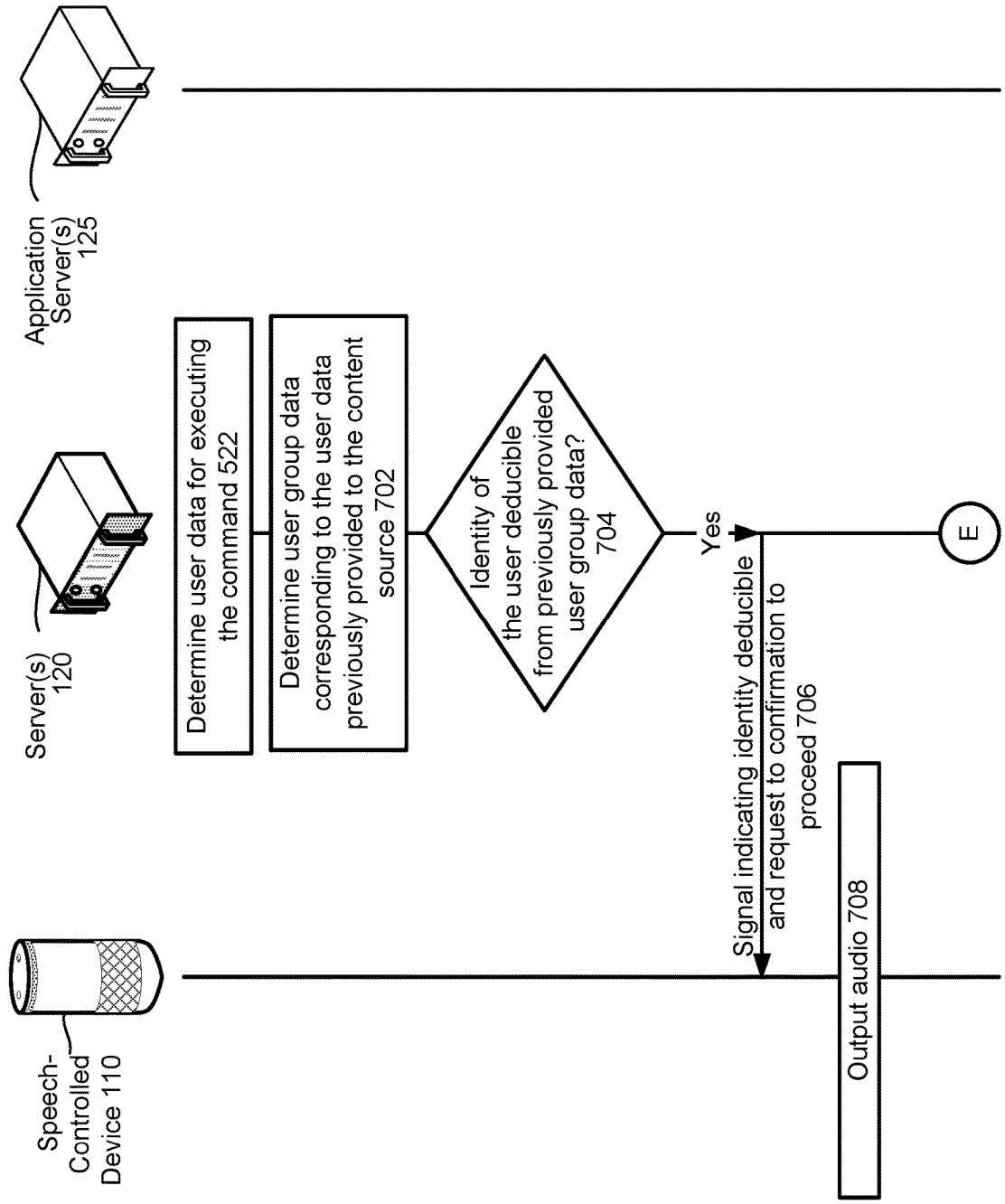

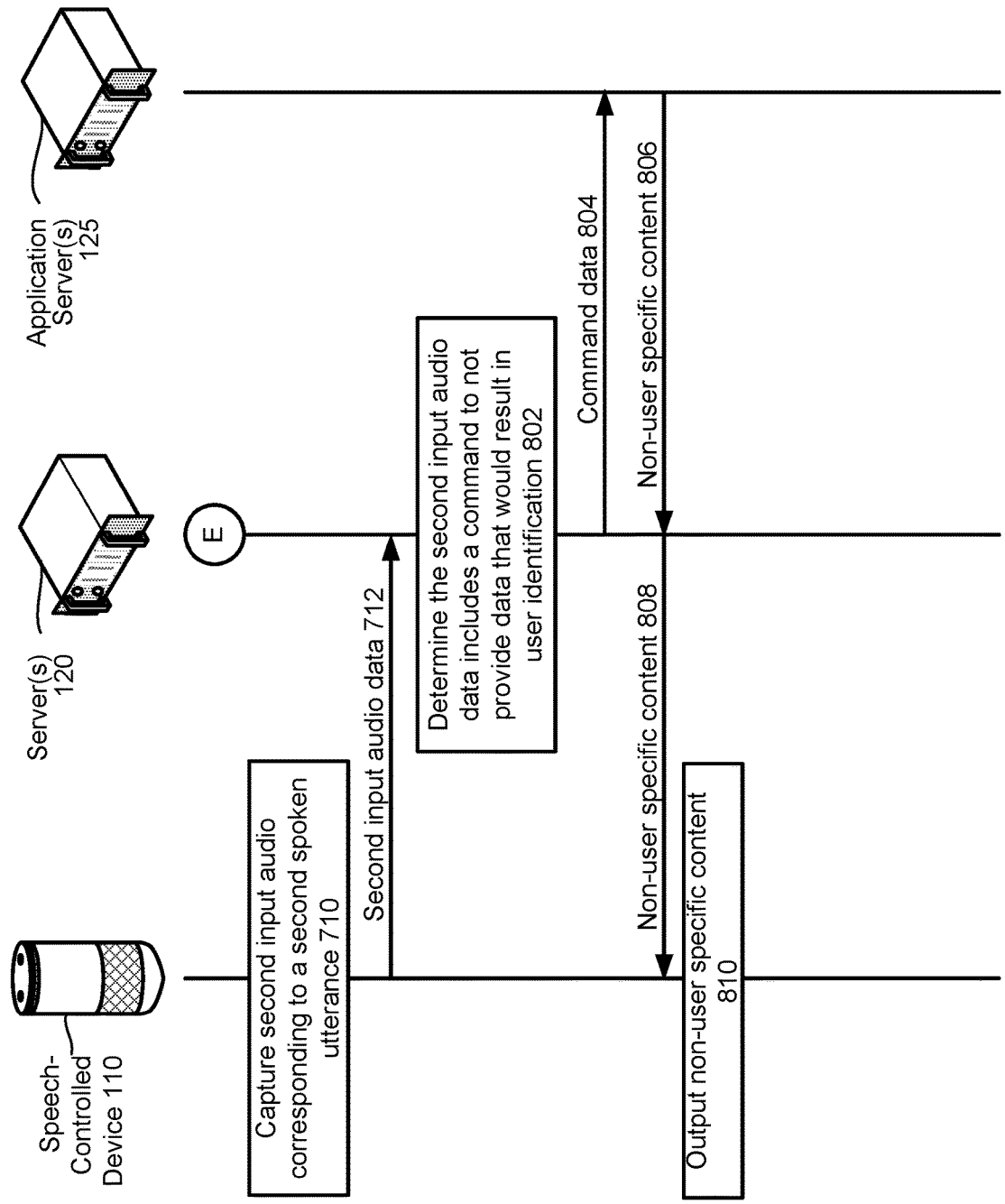

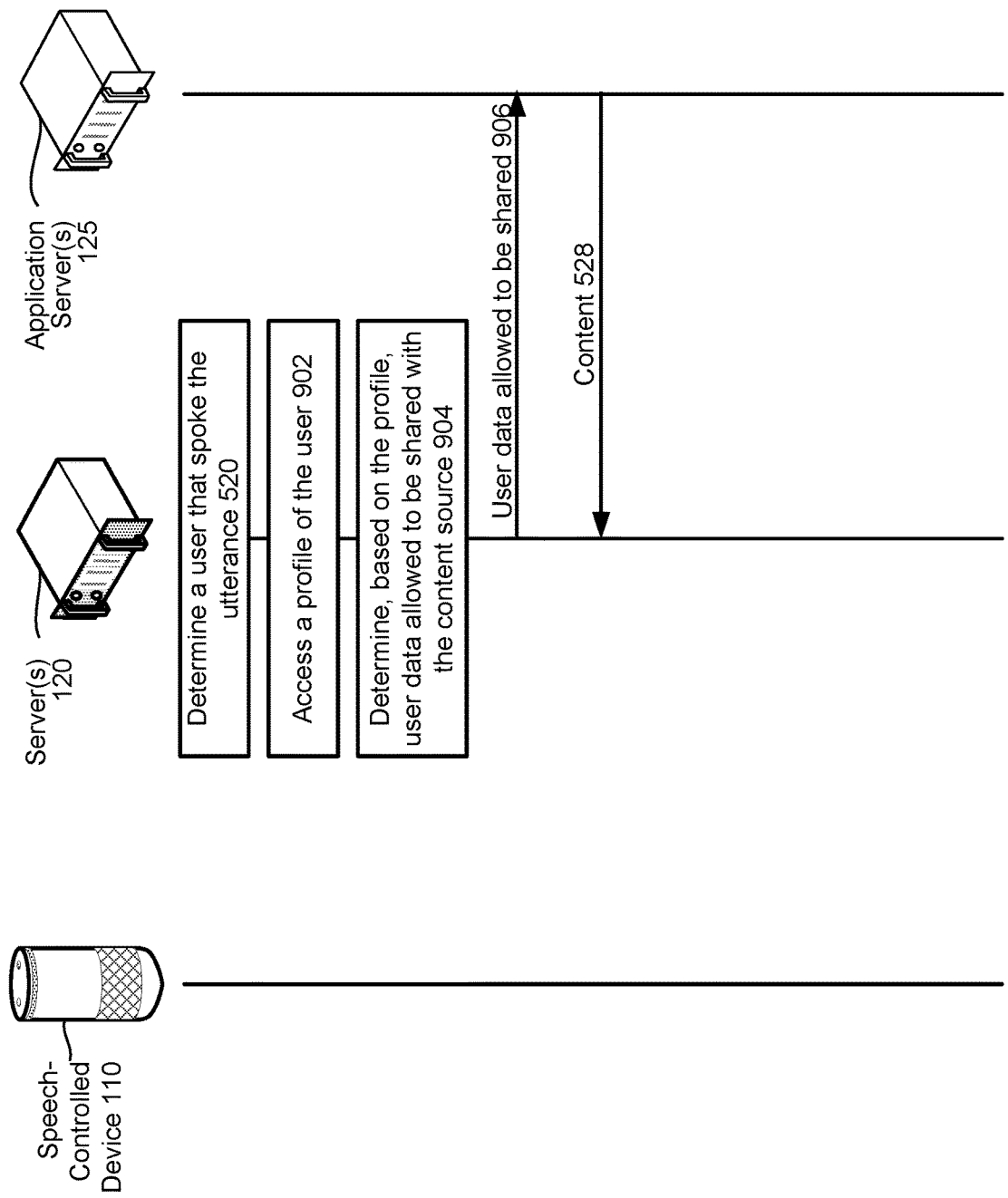

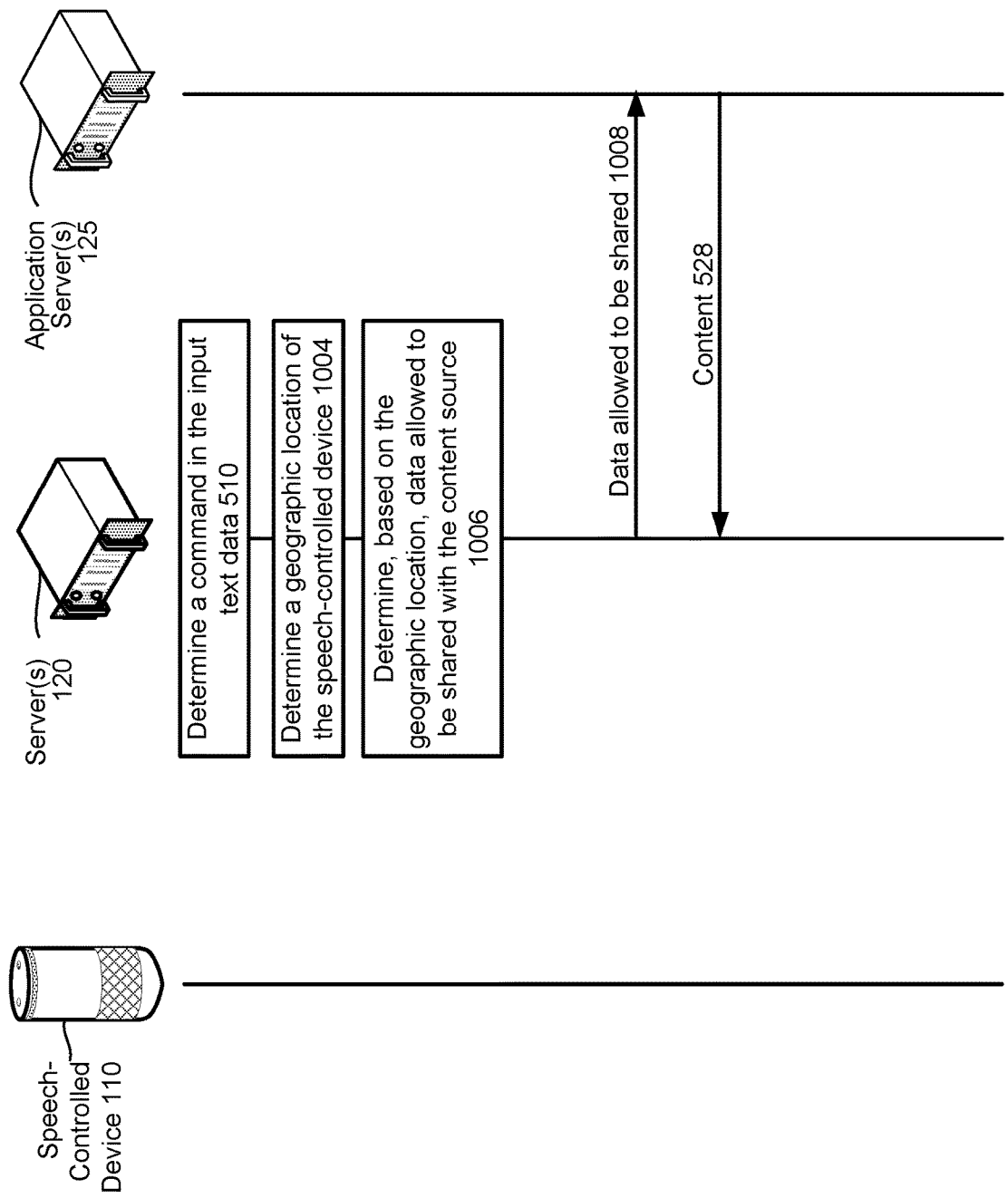

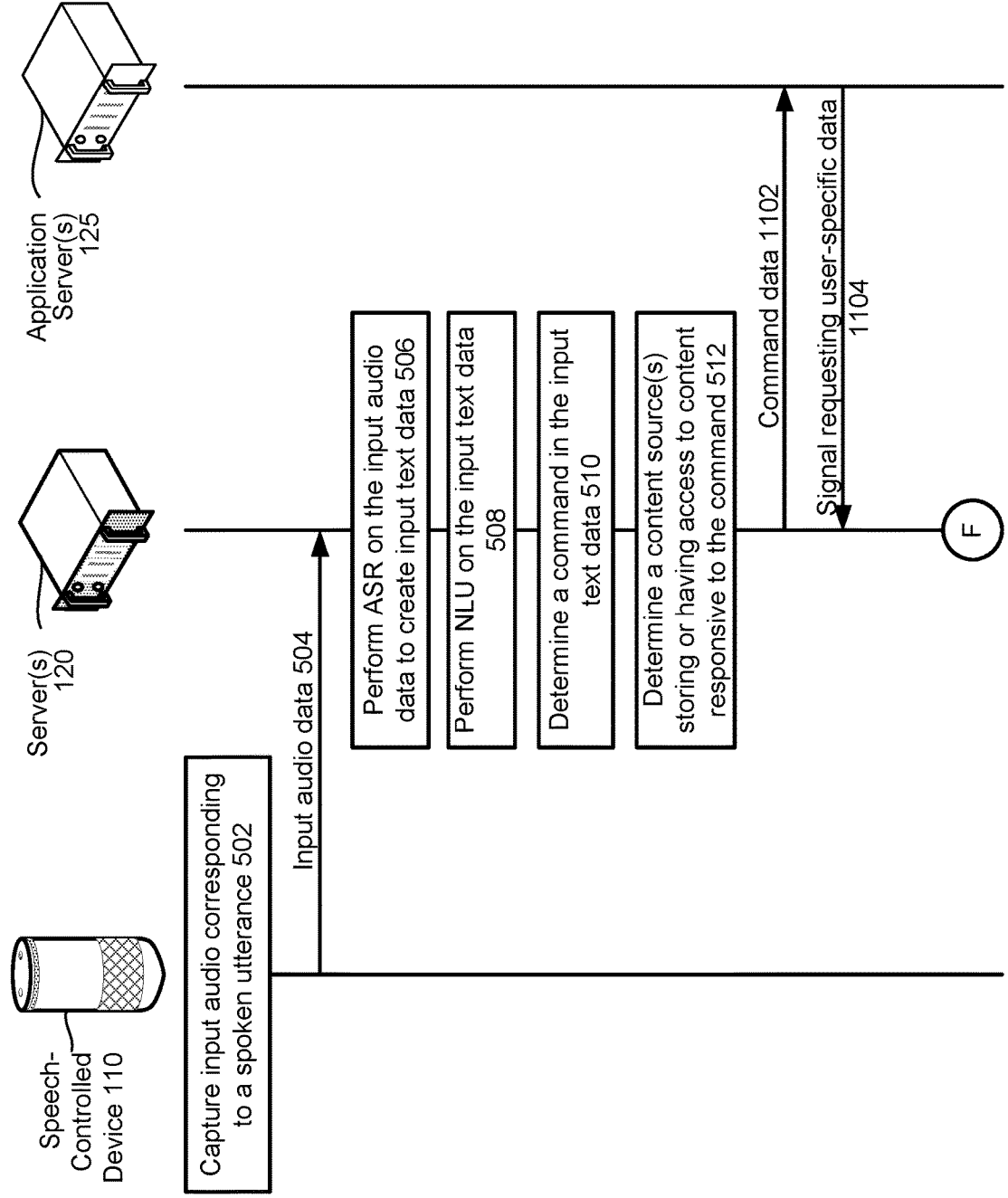

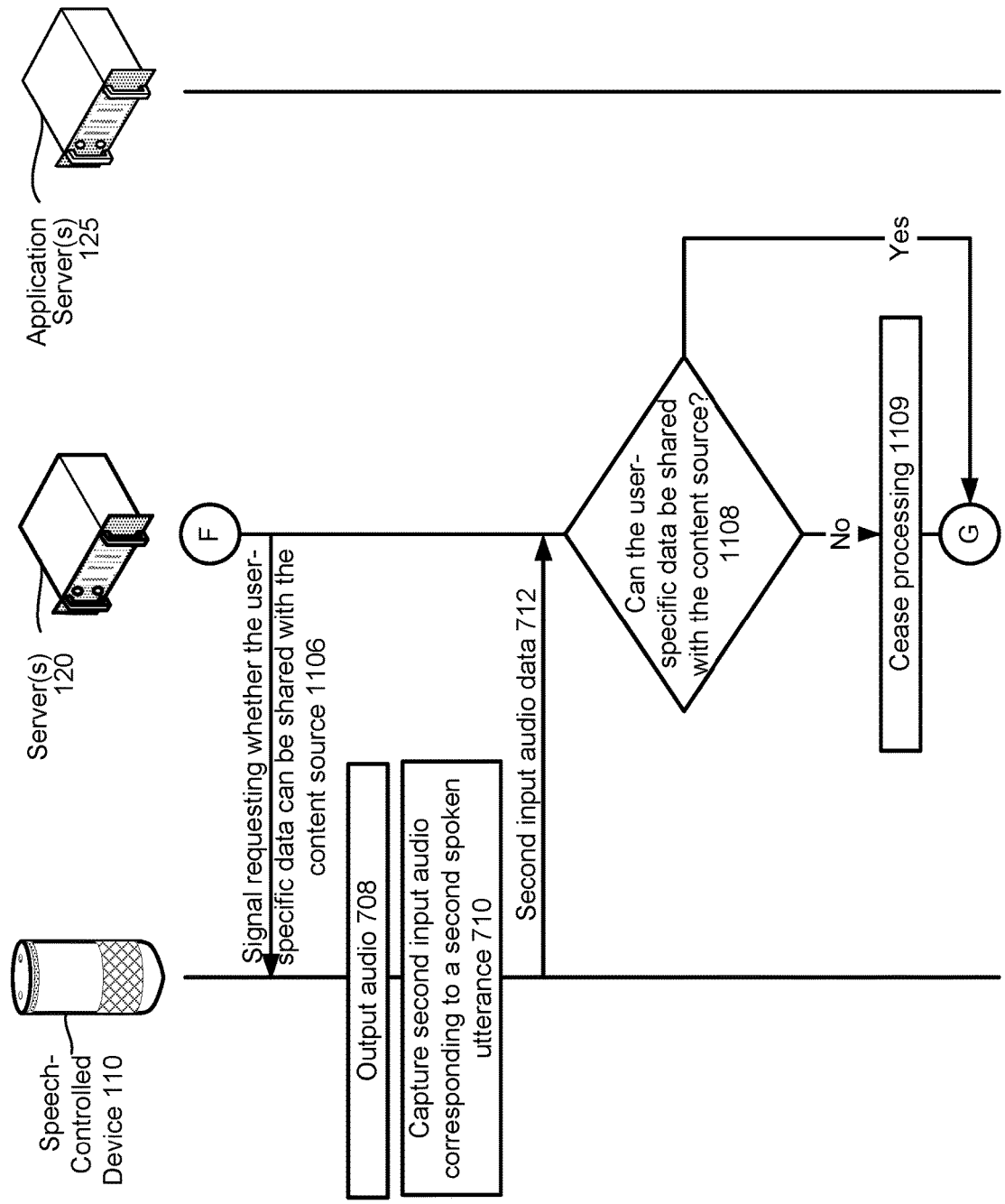

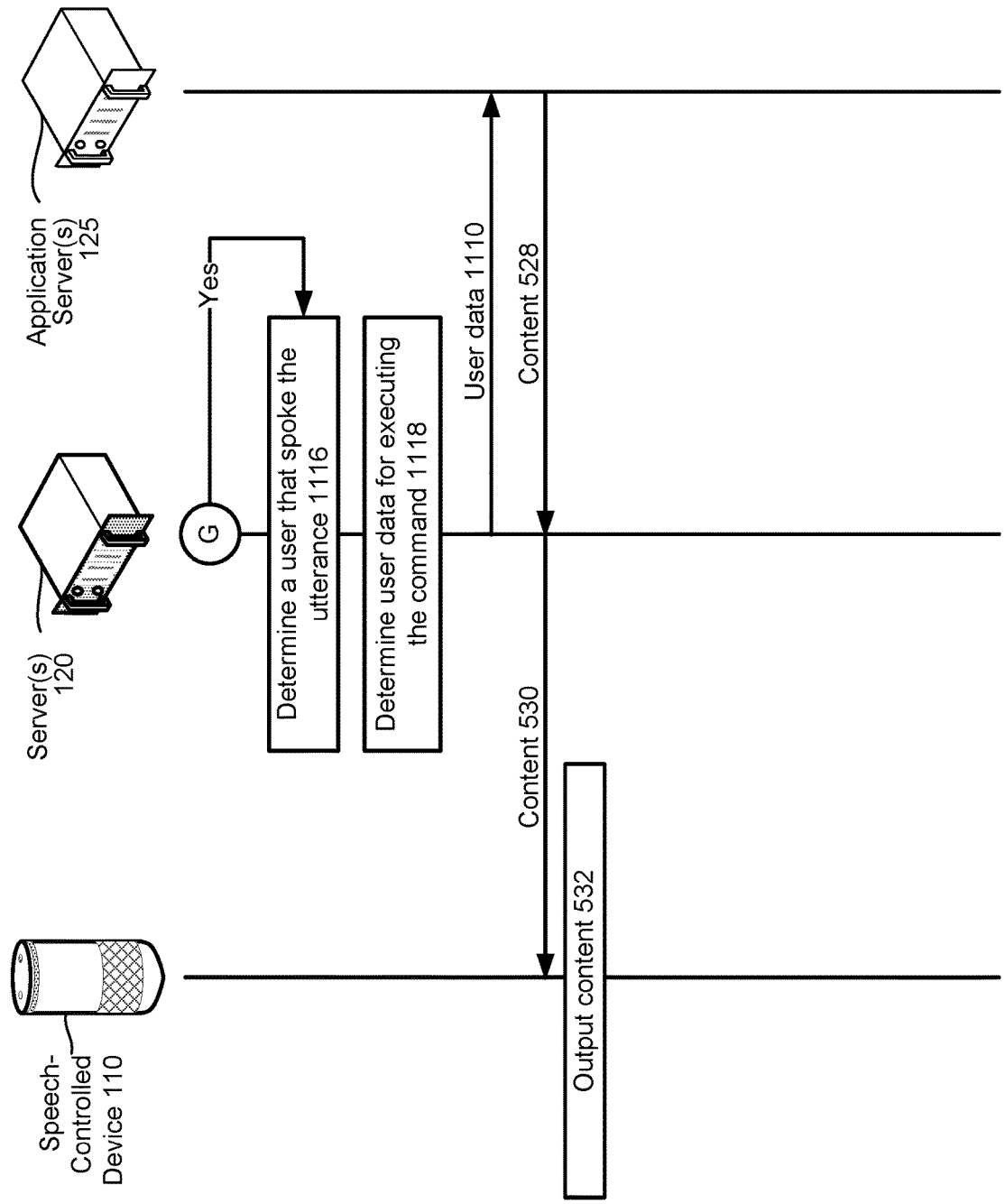

INTELLIGENT PRIVACY PROTECTION MEDIATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 5A and 5B are a signal flow diagram illustrating the obfuscation of user data to receive content response to a spoken command and the updating of user data obfuscation according to embodiments of the present disclosure.

FIGS. 7A and 7B are a signal flow diagram illustrating the receipt of a user directive regarding whether to provide data that may result in a content source determining an exact identity of the user according to embodiments of the present disclosure.

FIGS. 8A and 8B are a signal flow diagram illustrating the obtainment of non-user specific content when a user directive indicates data resulting in identification of the user should not be shared with a content source(s) according to embodiments of the present disclosure.

FIG. 9 is a signal flow diagram illustrating determining data to share with an application server(s) based on user preferences according to embodiments of the present disclosure.

FIG. 10 is a signal flow diagram illustrating determining data to share with an application server(s) based on a location of a speech-controlled device according to embodiments of the present disclosure.

FIGS. 11A through 11C are a signal flow diagram illustrating the obtainment of a user directive when an application server(s) requests specific user data according to embodiments of the present disclosure.

DETAILED DESCRIPTION

Figure 1:
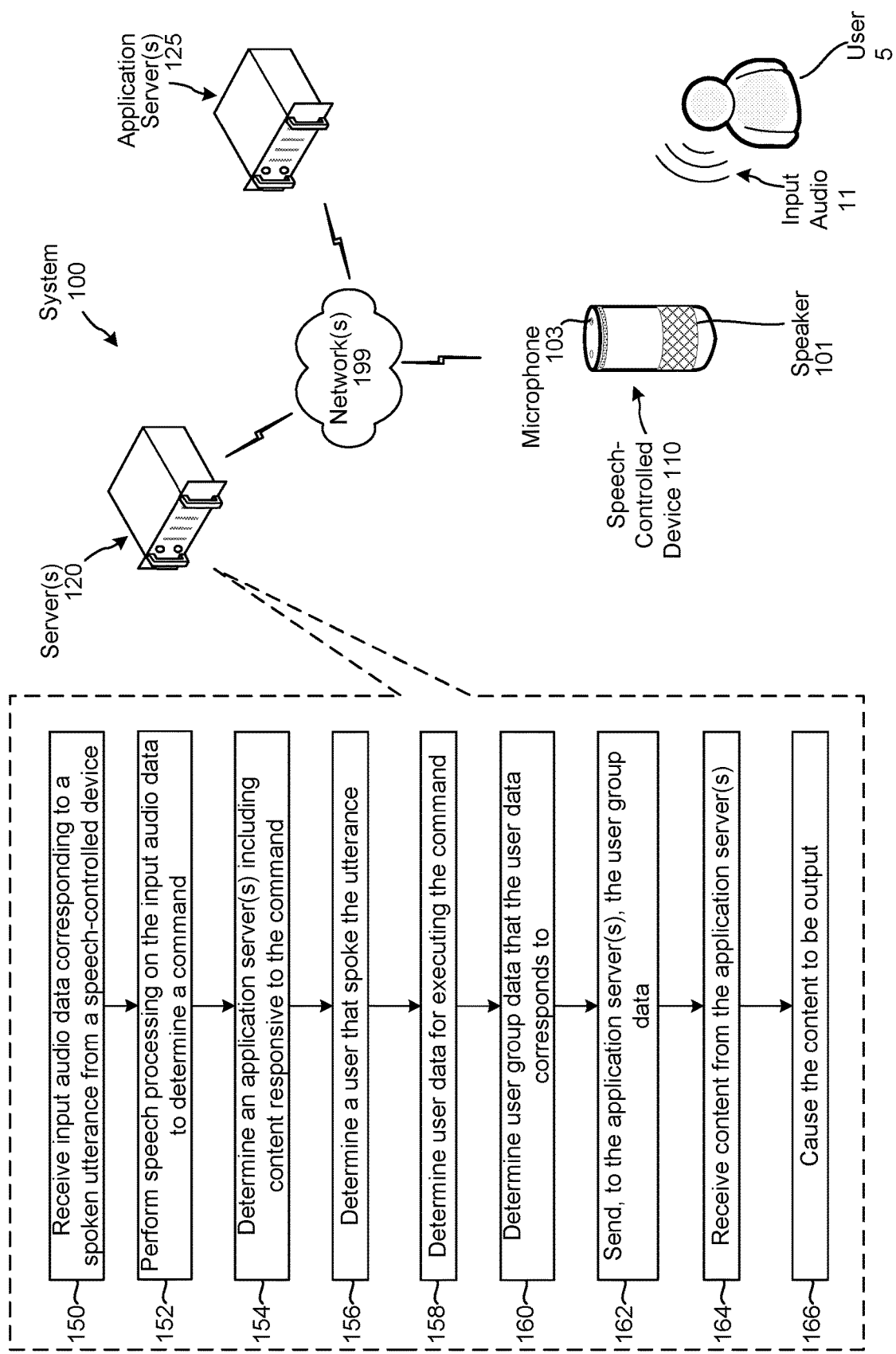
FIG. 1 illustrates a speech processing system for obfuscating user data according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A speech processing system may include a voice input device that is controlled by user speech. The speech processing system may communicate with various services (e.g., music services, banking services, etc.). A user may interact with (e.g., obtain or stream content from) the services by speaking a command to the voice input device. For example, a user may state "Play my music." In response, music from the user's playlist may be streamed from a music service to the voice input device. Often times a service requires the user have an account directly with the service. This allows the service to provide user specific content. For example, according to the above example, the speech processing system may send an indication of the user (e.g., the user's name, account number, other identifier) to the music service, and the music service may use the indication to determine a playlist of the user.

To set up an account with a service, a user may be required to provide the service with personal identification information (e.g., name, address, credit card information, etc.). This may be undesirable because a user may not want to share personal identification information with a service due to potential privacy concerns, etc.

The present disclosure provides a system that can obfuscate personal identification information of a user that may still allow secondary services to provide user specific content without necessarily enabling those secondary services to determine an exact identity of the user. Although explained herein in the context of a speech processing system that can capture and process spoken commands, requests for content or services may come in a variety of forms, such as a typed query, an input from a touch-sensitive device, an input from a web-enabled service, a physical gesture captured and/or recognized by a device, or other non-speech or multi-modal mechanism. The system may act as an intermediary between a user/user-account and a content source such that the system may receive an incoming request for content (in whatever form the request may take, either speech and/or non-speech) and process that request to remove, obfuscate, or otherwise protect user-specific information from the content source while allowing responsive content to be obtained from the content source and output to satisfy the incoming request. Thus, while the present disclosure describes the system operation from the point of view of a speech processing system, the disclosure is not so limited and processing of (or output of) speech is not required.

As an example of system operation, a speech processing system may receive a spoken command at a voice input device. Rather than sending personal identification information to a service invoked by the spoken command, the speech processing system may provide user group information to the service, with the user group information corresponding to the user. For example, if a user is 35 year old and the user says "Play fun music," the speech processing system may solicit music that is determined to be "fun" to a 30-40 year old person. This allows a music service to provide music that is fun to an age range in which the user falls, without the music service knowing an identity of the user. User group data may include data that is encompasses the specific user data without necessarily revealing the specific user data. Further, the user group data may include alternate data that may be close to, but not exactly the same as the user data, yet is selected to obtain the desired content without necessarily disclosing the specific user data. For example, if a content source requests the user's age, and the user is 35, the system may instead return data to the content source that indicates the user is 32. The user group data may have a same data type (e.g., age, location, account number, or the like) as the user data.

The system may also track information that is provided to a particular service/content source over time. For example, if a particular user has made multiple requests for content from a particular service, the system may track the requests made and/or the information provided to that particular service from the particular user. The system may determine, based on the information provided to the service, if the service may be capable of determining other information about the user, such as the user's identity. For example, in a certain situation a user may have made multiple requests for music from a particular music service (e.g., "play some work songs," "play songs for my commute," "play songs for my kids," or the like). For each of those requests, the system may have provided the service with user group data pertaining to the user, such as age range, occupation, state of residence, age of children or the like. Later the user may make a further request for music (e.g., "play songs my mom would like") that would require some further information be provided to the service, such as parent's age range. The system may determine that given all the previous information provided to the service, if the service was provided this further information, the service would have a certain likelihood of determining the identity of the requesting user. Further, the system may determine from certain user behavior patterns (such as requesting particular music repeatedly under certain circumstances) the service may have a certain likelihood of determining the user identity. The system may in that circumstance warn the user about the potential of the service determining the user's identity and may prompt the user to confirm that the further information should be provided to the service. In this way the computing system may interface between the user (or the user's profile) and other services/content sources thus protecting the user's information and/or identity. Other situations and implementations of the speech processing system are also possible.

The present system allows a request for content initiated by a user through a user device to be mediated by the system between the user device and a remote device associated with a content source. The system can determine user data that is responsive to further information needed by the remote device to provide the requested content, and obfuscate the user data so that user group data is provided instead of the specific user data and still allow the content to be delivered to a user device (either directly by the remote device or through the system). Unlike systems that rely on generalized user data (e.g., targeted advertisements) the present system obtains content specifically requested by a user and obtains that content using user group data corresponding to a type of user data needed to access the content.

FIG. 1 shows a speech processing system 100 that obfuscates user data. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more speech-controlled devices 110 local to a user 5, as well as one or more networks 199 and one or more servers 120 connected to the speech-controlled device(s) 110 across the network(s) 199. The server(s) 120 (which may be one or more different physical devices) may be capable of performing traditional speech processing (e.g., ASR, NLU, command processing, etc.) as described herein. A single server 120 may perform all speech processing or multiple servers 120 may combine to perform all speech processing. Further, the server(s) 120 may execute certain commands, such as answering spoken utterances of the user 5. In addition, certain speech detection or command execution functions may be performed by the speech-controlled device 110.

As shown in FIG. 1, the speech-controlled device 110 capture a spoken utterance (i.e., input audio 11) of the user 5 via a microphone 103 of the speech-controlled device 110. The speech-controlled device 110 sends input audio data (corresponding to the input audio 11) to the server(s) 120 for processing. Alternatively, a microphone array (not illustrated), separate from the speech-controlled device 110, may capture the input audio 11. In an example, the microphone array is in direct communication with the speech-controlled device 110 such that when the microphone array captures the input audio 11, the microphone array sends the input audio data to the speech-controlled device 110. The speech-controlled device 110 may then forward the received input audio data to the server(s) 120. In another example, the microphone array is in indirect communication with the speech-controlled device 110 via a companion application of a mobile computing device, such as a smart phone, tablet, laptop, etc. In this example, when the microphone array captures the input audio 11, the microphone array sends the input audio data to the companion application, which forwards the input audio data to the speech-controlled device 110. The speech-controlled device 110 may then forward the input audio data to the server(s) 120. In yet another example, the microphone array is in indirect communication with the server(s) 120 via the companion application such that when the microphone array captures the input audio 11, the microphone array sends the input audio data to the companion application, which forwards the input audio data to the server(s) 120.

The server(s) 120 receives (150), from either the speech-controlled device 110 or a companion application, the input audio data. The server(s) 120 performs (152) speech processing (e.g., ASR and NLU) on the input audio data to determine a spoken command of the spoken utterance. The server(s) 120 may also determine (154) one or more content sources (e.g., one or more application servers 125) storing or having access to content responsive to the spoken command.

The server(s) 120 determines (156) a user that spoke the utterance and determines (158) user data (or a type of user data) for executing the spoken command. The user data may be determined from a user profile associated with the determined user. For example, the server(s) 120 may perform speech based user recognition to determine the user 5, access a profile associated with the user 5, and therein determine data associated with the user. The determined user data may be personal identification information such as, for example, a name of the user, an age of the user, a location of the user, etc. Each portion of personal identification information (i.e., name, age, location, etc.) may be considered a separate type of user data.

The server(s) 120 may also determine (160) user group data corresponding to the user data. The user group data may include groups of age ranges (ranges of 2 years, ranges of 5 years, ranges of 10 years, etc.), groups of location areas (e.g., specific to cities, counties, states, countries, regions in countries, continents, etc.), and other groups associated with personal identification information. For example, the user 5 may be 32 years old and may live in Seattle, Wash. User group data corresponding to the user 5 of this example may include an age of 30-35 and a geographical location of Washington state. By obfuscating (or genericizing) the user data as such, the server(s) 120 decreases the likelihood that the application server(s) 125 will be able to determine an exact identity of the user 5.

The server(s) 120 sends (162) the user group data to the application server(s) 125. The server(s) 120 also receives (164), from the application server(s) 125, content that is responsive to the spoken command and associated (i.e., relevant) to the user group data. The server(s) 120 should be configured to make the user group data as specific as possible such that content relevant to the user 5 will be returned to the server(S) 120, but not too specific such that an exact identity of the user 5 may be determined by the application server(s) 125. The server(s) 120 then causes (166) the content to be output. The content may be output by the speech-controlled device 110, or another device indicated in the profile of the user 5.

As described above, a user may speak a request for content, and the speech may be processed by the system. Other modalities for requesting content are also possible. In an example, a user may request content by interacting with a touch screen of a computing device, such as a tablet, smart phone, smart watch, etc.

Figure 2:
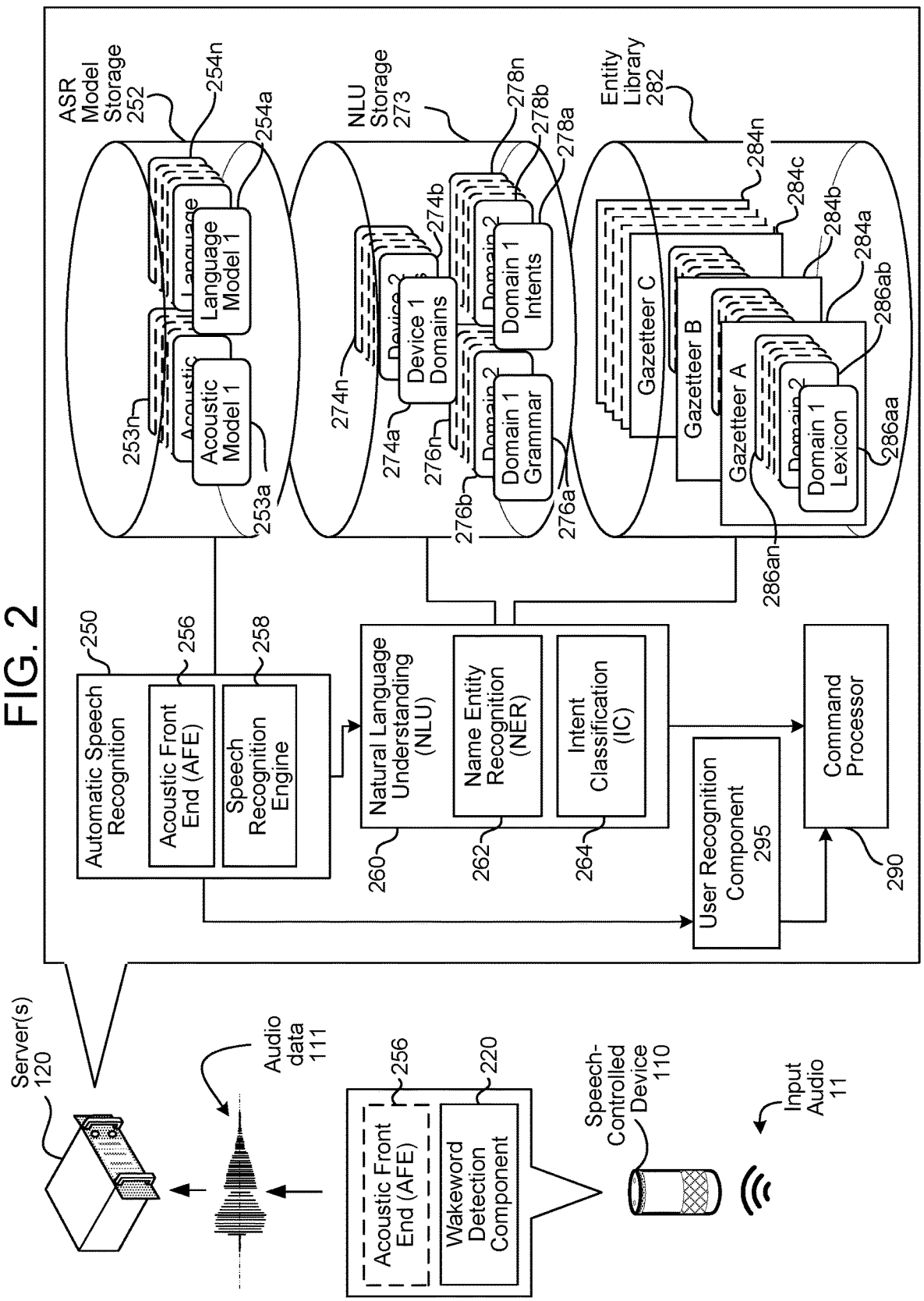
FIG. 2 is a conceptual diagram of how a spoken utterance may be processed according to embodiments of the present disclosure.

Further details of the speech-processing system 100 that obfuscates user data are explained below, following a discussion of the overall speech processing system of FIG. 2. FIG. 2 is a conceptual diagram of how a spoken utterance is processed. The various components illustrated may be located on a same or different physical devices. Communication between various components illustrated in FIG. 2 may occur directly or across a network(s) 199. An audio capture component, such as the microphone 103 of the speech-controlled device 110 (or other device), captures input audio 11 corresponding to a spoken utterance. The device 110, using a wakeword detection component 220, then processes the audio, or audio data corresponding to the audio, to determine if a keyword (such as a wakeword) is detected in the audio. Following detection of a wakeword, the device 110 sends audio data 111, corresponding to the input audio 11, to a server(s) 120 that includes an ASR component 250. The audio data 111 may be output from an acoustic front end (AFE) 256 located on the device 110 prior to transmission. Or the audio data 111 may be in a different form for processing by a remote AFE 256, such as the AFE 256 located with the ASR component 250.

The wakeword detection component 220 works in conjunction with other components of the device 110, for example a microphone 103 to detect keywords in audio 11. For example, the device 110 may convert audio 11 into audio data, and process the audio data with the wakeword detection component 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection component 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. The audio data 111 may be sent to the server(s) 120 for routing to a recipient device or may be sent to the server(s) 120 for speech processing for interpretation of the included speech (either for purposes of enabling voice-communications and/or for purposes of executing a command in the speech). The audio data 111 may include data corresponding to the wakeword, or the portion of the audio data 111 corresponding to the wakeword may be removed by the local device 110 prior to sending.

Upon receipt by the server(s) 120, an ASR component 250 may convert the audio data 111 into text data. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR component 250 may compare the audio data 111 with models for sounds (e.g., subword units, phonemes, etc.) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs the most likely text recognized in the audio data 111. The ASR component 250 may also output multiple hypotheses in the form of a lattice or an N-best list with each hypothesis corresponding to a confidence score or other score (e.g., such as probability scores, etc.).

The device or devices including the ASR component 250 may include an AFE 256 and a speech recognition engine 258. The AFE 256 transforms the audio data 111 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. Many different features may be determined, as known in the art, and each feature represents some quality of the audio that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post front-end processed data (e.g., feature vectors) may be received by the device executing ASR processing from another source besides the internal AFE 256. For example, the speech-controlled device 110 may process audio data 111 into feature vectors (e.g., using an on-device AFE 256) and transmit that information to the server(s) 120 across the network(s) 199 for ASR processing. Feature vectors may arrive at the server(s) 120 encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, by the server(s) 120, or by another device (e.g., a server running a search engine, etc.)

The device performing NLU processing (e.g., the server(s) 120) may include various components, including potentially dedicated processor(s), memory, storage, etc. The device performing NLU processing may include a dedicated NLU component/component 260, which may include a named entity recognition (NER) component 262, and intent classification (IC) component 264. The device performing NLU processing may additionally include NLU storage 273, and a knowledge base (not illustrated). The knowledge base is a database or other information storage that may include information about entities that may be used in resolving spoken utterances. The NLU component 260 may also utilize gazetteer information 284a-284n stored in an entity library storage 282. The knowledge base and/or gazetteer information 284a-284n may be used for entity resolution, for example matching ASR results with different entities (e.g., song titles, contact names, etc.). Gazetteers 284a-284n may be linked to users (e.g., a particular gazetteer may be associated with a specific user's music collection), may be linked to certain domains (e.g., shopping), or may be organized in a variety of other ways.

The NLU component 260 takes text data (e.g., output from the ASR component 250 based on the spoken utterance/input audio 11) and attempts to make a semantic interpretation of the text data. That is, the NLU component 260 determines the meaning behind the text data based on the individual words and then implements that meaning. The NLU component 260 interprets a text string to derive an intent or a desired action from the user as well as the pertinent pieces of information in the text data that allow a device (e.g., the speech-controlled device 110, the server 120, etc.) to complete that action. For example, if a spoken utterance is processed using the ASR component 250, which outputs the text data "call mom", the NLU component 260 may determine the user intended to activate a telephone in his/her device and to initiate a call with a contact matching the entity "mom."

The NLU component 260 may process several textual inputs related to the same utterance. For example, if the ASR component 250 outputs N text segments (e.g., as part of an N-best list), the NLU component 260 may process all N outputs to obtain NLU results.

As will be discussed further below, the NLU component 260 may be configured to parse and tag to annotate text data as part of NLU processing. For example, for the text data "call mom," "call" may be tagged as a command (e.g., to execute a phone call) and "mom" may be tagged as a specific entity and target of the command. In addition, the telephone number for the entity corresponding to "mom" stored in a contact list may be included in the annotated NLU results.

To correctly perform NLU processing of speech input, the NLU component 260 may be configured to determine a "domain" of the utterance so as to determine and narrow down which services offered by an endpoint device (e.g., the server(s) 120, or the speech-controlled device 110) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from the contact list).

The NER component 262 receives an utterance in the form of ASR results and attempts to identify relevant grammars and lexical information that may be used to construe meaning. To do so, the NER component 262 may begin by identifying potential domains that may relate to the received utterance. The NLU storage 273 includes a database of domains 274a-274n associated with specific devices. For example, the voice input device 110 may be associated with domains for music, telephony, calendaring, contact lists, and device-specific communications, but not video. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 276a-276n, a particular set of intents/actions 278a-278n, and/or a particular personalized lexicon 286. Each gazetteer 284a-284n may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance will be NLU processed using the grammar models and lexical information for communications, and will also be processed using the grammar models and lexical information for music. The responses to the spoken utterance produced by each set of models is scored (as discussed further below), with the overall highest ranked result from all applied domains being ordinarily selected to be the correct result.

An IC component 264 parses the utterance to determine an intent(s) for each identified domain, where the intent(s) corresponds to the action to be performed that is responsive to the spoken utterance. Each domain is associated with a database 278a-278n of words linked to intents. For example, a music intent database may link words and phrases such as "quiet," "volume off," and "mute" to a "mute" intent. The IC component 264 identifies potential intents for each identified domain by comparing words in the utterance to the words and phrases in the intents database 278.

In order to generate a particular interpreted response, the NER component 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model 276 associated with a shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar 276 framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the spoken utterance to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 262 may be constructed using techniques such as HMMs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (i.e., in the NLU storage 273). For instance, if the utterance was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged utterance word or phrase, how closely the grammatical structure of the utterance corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the speech-controlled device 110 "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the utterance. So, for example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing, which may include tagged text data, commands, etc., may then be sent to a command processor 290, which may be located on a same or separate server(s) 120 as part of the system 100. The system 100 may include more than one command processor 290, and the command processor(s) 290 may be determined based on the NLU output. For example, if the NLU output includes a command to play music, the command processor(s) 290 selected may be a music playing application, such as one located on the speech-controlled device 110 or in a music playing appliance, configured to execute a music playing command. If the NLU output includes a search utterance (e.g., requesting the return of search results), the command processor(s) 290 selected may include a search engine processor, such as one located on a search server, configured to execute a search command and determine search results, which may include output text data to be processed by a TTS engine and output from a device as synthesized speech.

Further, the ASR component 250 may output ASR confidence score data for further processing by a user recognition component 295. The user recognition component 295 performs processes to identify a user (i.e., determine an identity of a user) as well as verify the user (i.e., confirm that the identified user is correct). The user recognition component 295 performs user recognition using the audio data 111, and optionally the ASR component output. The user recognition component 295 may include a scoring component that determines respective scores indicating whether the input utterance in the audio data 111 was spoken by particular users. The user recognition component 295 may also include a confidence component that determines an overall confidence as the accuracy of user recognition operations. Output of the user recognition component 295 may be provided to the command processor 290. The command processor 290 may use the user recognition component output to determine application servers 125, as well as perform other functions described herein.

Figure 3:
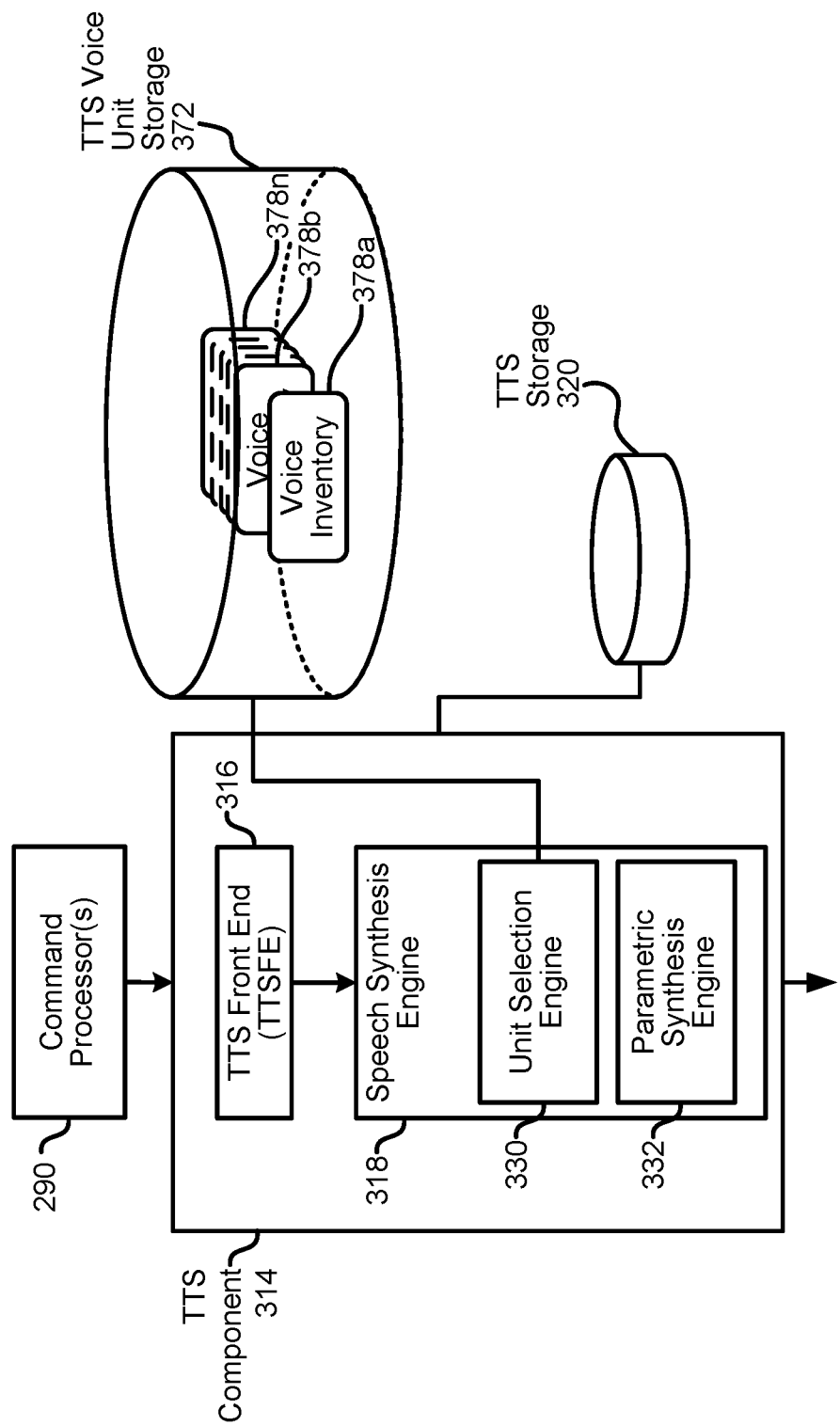
FIG. 3 is a conceptual diagram of how text-to-speech processing is performed according to embodiments of the present disclosure.

A TTS component 314 may receive tagged text data from the command processor(s) 290, so the TTS component 314 may synthesize speech corresponding to the text data. Speech may be synthesized by the TTS component 314 as described below with respect to FIG. 3.

The TTS component/processor/component 314 includes a TTS front end (TTSFE) 316, a speech synthesis engine 318, and a TTS storage 320. The TTSFE 316 transforms input text data (e.g., from the command processor(s) 290) into a symbolic linguistic representation for processing by the speech synthesis engine 318. The TTSFE 316 may also process tags or other data input to the TTS component 314 that indicate how specific words should be pronounced. The speech synthesis engine 318 compares the annotated phonetic units and information stored in the TTS storage 320 for converting the input text data into speech (i.e., audio data). The TTSFE 316 and the speech synthesis engine 318 may include their own controller(s)/processor(s) and memory, or they may use the controller(s)/processor(s) and memory of the server(s) 120, the speech-controlled device 110, or another device, for example. Similarly, the instructions for operating the TTSFE 316 and the speech synthesis engine 318 may be located within the TTS component 314, within the memory and/or storage of the server(s) 120, the speech-controlled device 110, or within an external device.

Text data input into the TTS component 314 may be sent to the TTSFE 316 for processing. The TTSFE 316 may include components for performing text normalization, linguistic analysis, and linguistic prosody generation. During text normalization, the TTSFE 316 processes the input text data and generates standard/normalized text data, converting such things as numbers, abbreviations (e.g., Apt., St., etc.), and symbols ($, %, etc.) into the equivalent of written out words.

During linguistic analysis the TTSFE 316 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS component 314 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 320. The linguistic analysis performed by the TTSFE 316 may also identify different grammatical components such as prefixes, suffixes, phrases, punctuation, syntactic boundaries, or the like. Such grammatical components may be used by the TTS component 314 to craft a natural sounding audio waveform output. The language dictionary may also include letter-to-sound rules and other tools that may be used to pronounce previously unidentified words or letter combinations that may be encountered by the TTS component 314. Generally, the more information included in the language dictionary, the higher quality the speech output.

Based on the linguistic analysis, the TTSFE 316 may then perform linguistic prosody generation where the phonetic units are annotated with desired prosodic characteristics, also called acoustic features, which indicate how the desired phonetic units are to be pronounced in the eventual output speech. During this stage, the TTSFE 316 may consider and incorporate any prosodic annotations that accompanied the text data input to the TTS component 314. Such acoustic features may include pitch, energy, duration, and the like. Application of acoustic features may be based on prosodic models available to the TTS component 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 316, referred to as a symbolic linguistic representation, may include a sequence of phonetic units annotated with prosodic characteristics. This symbolic linguistic representation may be sent to the speech synthesis engine 318, also known as a synthesizer, for conversion into an audio waveform of speech for output to an audio output device and eventually to a user. The speech synthesis engine 318 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 330 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis, called parametric synthesis, parameters such as frequency, volume, and noise are varied by a parametric synthesis engine 332, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS component 314 may include an acoustic model, or other models, which may convert a symbolic linguistic representation into a synthetic acoustic waveform of the input text data based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 316.

The parametric synthesis engine 332 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to the parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 318, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 378a-378n (stored in TTS voice unit storage 372), where each unit database is configured with a different "voice." Such voice inventories may also be linked to user accounts, discussed below. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match a desired speech quality. The customized voice inventory 378 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS component 314 may synthesize speech as normal, but the system 100, either as part of the TTS component 314 or otherwise, may apply a filter to make the synthesized speech take on the desired speech quality. In this manner a traditional TTS output may be altered to take on the desired speech quality.

During runtime the TTS component 314 may receive text data for speech synthesis along with an indicator for a desired speech quality of the output speech. The TTS component 314 may then select a voice matching the speech quality, either for unit selection or parametric synthesis, and synthesize speech using the received text data and speech quality indicator.

Figure 4:
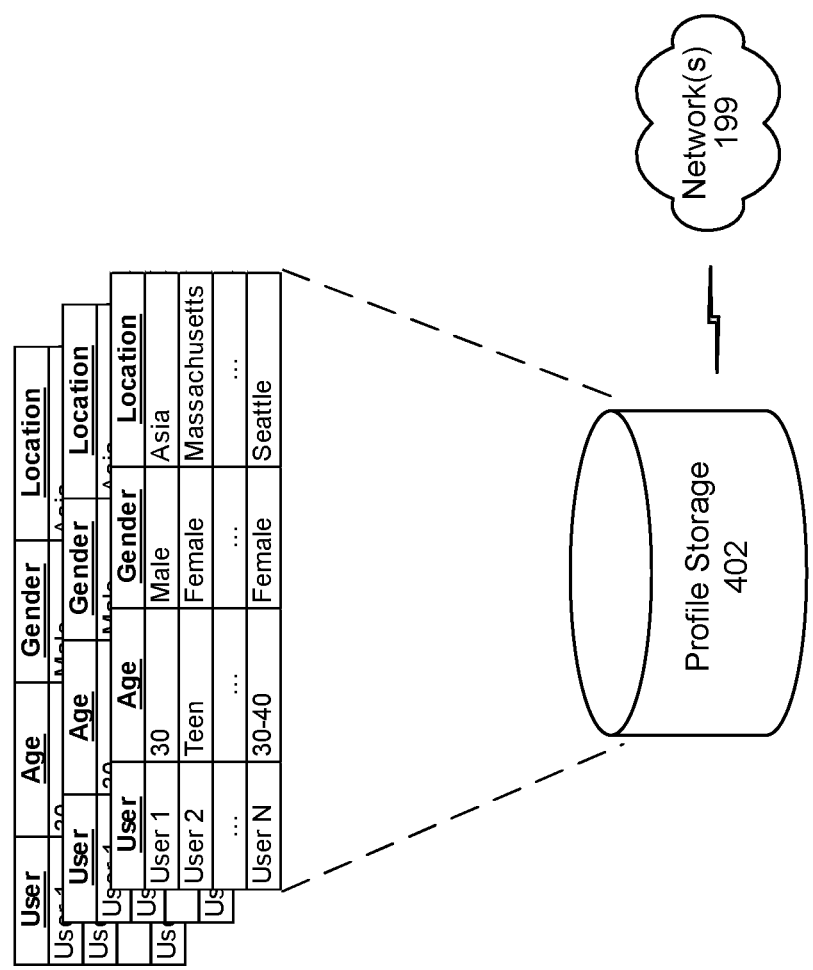
FIG. 4 illustrates data stored and associated with user profiles according to embodiments of the present disclosure.

FIG. 4 illustrates a profile storage 402 that includes data regarding user accounts and/or respective devices as described herein. The profile storage 402 may be located proximate to the server(s) 120, or may otherwise be in communication with various components, for example over the network(s) 199. The profile storage 402 may include a variety of information related to individual users, accounts, devices, etc. that interact with the system 100. In an example, the user profile storage 402 is a cloud-based storage. Each profile may include data such as device identifier (ID) data, internet protocol (IP) address data, name of device data, and location of device data for different devices. In addition, each profile may include personal identification information usable by the server(s) 120 (or a component thereof such as a command processor(s) 290) to obtain content from an application server(s) 125. The personal identification information in the profile may include age of the user, gender of the user, location of the user, credit card number of the user, etc.

Although the term "user" may refer to a natural person, it may also refer to other kinds of entities such as a computer or service, a business, an organization or other entity that may request content where some form of data regarding the entity may be needed to obtain content. In order to obtain the content the present system may provide alternate data (such as group data), or otherwise obfuscate data to the content source to obtain the content, where the alternate data/ obfuscated data corresponds to the entity. The entity's data may correspond to a user profile for the entity, even if the entity may not necessarily be a natural person.

Different services (e.g., represented by application servers 125) may determine different types and/or amounts of content to be responsive to a given spoken command. For example, if a user says "play my music," a first application server may provide rock and jazz music while a second application server may provide only jazz music. Moreover, the accuracy of an application server(s) 125 to provide responsive content may be influenced by a specificity of the data provided to the application server(s) 125. According to the above music example, if the first and second application servers are each provided with data indicating the user is between ages 20-30, the first application server may provide jazz music applicable to a user of age 20-25 while the second application server may provide jazz music applicable to a user of age 25-30. In another example, if a user says "what mortgage rates can I get" the responsive content may also depend on the amount of information provided to the application server(s) 125, such as income, geographic location, etc. FIGS. 5A and 5B illustrate obtaining content responsive to a spoken command based on obfuscated personal identification information (i.e., based on generalized user group data to which the user corresponds). FIGS. 5A and 5B also illustrate the training of one or more models or components of the server(s) 120 to maximize a specificity of the user group data provided to the application server(s) 125 (thereby maximizing the accuracy of an application server(s) 125 to provide responsive content) while maintaining the identity of the user a secret from the application server(s) 125.

The speech-controlled device 110 captures (502) input audio corresponding to a spoken utterance, and sends (504) input audio data corresponding thereto to the server(s) 120.

The server(s) 120 performs speech processing on the input audio data. For example, the server(s) 120 may perform (506) ASR on the input audio data to create input text data, and may perform (508) NLU on the input text data to generate NLU results. The server(s) 120 may use the NLU results to determine (510) a command in the input text data.

The server(s) 120 determines (512) one or more content sources (i.e., one or more application servers 125) storing or having access to content responsive to the command. The server(s) 120 may determine (514) data known to be needed by the application server(s) 125 to execute the command. For example, the server(s) 120 may access a table including data indicating various application servers 125 associated with various commands as well as associated with data known to be needed for execution of each of the respective commands. The server(s) 120 may also or alternatively (e.g., if the server(s) 120 does not know of any data needed by the application server(s) 125) send (516) a signal to the application server(s) 125, with the signal requesting an indication of the types of data needed to execute the command. The server(s) 120 may also receive (518) a signal from the application server(s) 125, with the signal indicating the types of data needed to execute the command.

The server(s) 120 determines (520) a user that spoke the utterance. For example, the server(s) 120 may determine the user by comparing speech characteristics of the input audio data to stored speech characteristics associated with users of the speech-controlled device 110 from which the input audio data was received. For further example, the server(s) 120 may determine the user using image data including a representation of the user. The image data may be captured by a camera of the speech-controlled device 110, or a camera separate from but in communication with the speech-controlled device 110 (and/or the server(s) 120). Other types of user recognition are also possible.

The server(s) 120 also determines (522) user data useful and/or needed for executing the command. To determine the user data, the server(s) 120 may access a profile associated with the user, and determine the user data within the profile. The user data determined in the profile may be based on the known data needed to execute the command (e.g., determined from a table stored by or accessible to the server(s) 120) and/or the signal indicating the data received by the server(s) 120 from the application server(s) 125. As such, the user data determined for executing the command may include a portion or all of the user data represented in the profile.

The server(s) 120 also determines (524) user group data to which the user data corresponds. The user group data may include groups or ranges of types of data. For example, the user group data may include age ranges partitioned by 2 year spans, 5 year spans, 10 year spans, or the like. For further example, the user group data may include locations partitioned by city, county, state, country, continent, and the like. Other types of generalized personal identification information may also be represented in the user group data. For example, if the application server(s) 125 requires an age of the user in order to determine responsive content, and the user's age is 27, the server(s) 120 may determine user group data indicating an age of 20-30, 25-30, 27-28, or some other age range that encompasses the user's age.

The server(s) 120 sends (526) the user group data and an indication of the command to the application server(s) 125. The application server(s) 125 determines content responsive to the command based on the user group data. The server(s) 120 receives (528) the content and sends (530) the content to the speech-controlled device 110 (or another device indicated in the profile of the user). The server(s) 120 may forward the content to the speech-controlled device 110 as is (i.e., without performing any processing on the content when it is received). Alternatively, the server(s) 120 may receive the content in a first format (not capable of being output by the speech-controlled device 110), and may process the content into a second format (that may be output by the speech-controlled device 110) prior to sending the content to the speech-controlled device 110.

The speech-controlled device 110 outputs (532) the content. The speech-controlled device 110 also outputs (not illustrated) an indication soliciting the user to indicate a correctness/applicability of the content with respect to the command. The indication may be in the form of computer-generated speech (created by TTS processing disclosed herein) and/or visual content (such as text on a display). The speech-controlled device 110 receives (534) feedback indicating a correctness/applicability of the content. The feedback may be provided by a user speaking the feedback, by a user interacting with a virtual button of a display, by a user interacting with a physical button, etc. The speech-controlled device 110 sends (536) feedback data corresponding to the feedback to the server(s) 120.

The server(s) 120 updates/refines (538) the user group data based on the feedback data. If the feedback data indicates the content is applicable to the command, the server(s) 120 may not update the user group data. If the feedback data indicates the content is not applicable to the command, the server(s) 120 may update the user group data. For example, if the user group data originally had an age range of 10 years and the feedback data indicates the content is not applicable to the command, the server(s) 120 may narrow the age range to five years for that particular command. The server(s) 120 should be configured to only update the user group data if such updating will not result in the application server(s) 125 determining exact identity of users. User group data may be configured and updated on a command level, application server level, or the like. For example, a single application server 125 may execute a first command and a second command. The first command may be associated with user group data having an age range of 10 years while the second command may be associated with user group data having an age range of 5 years. For further example, a single command may be executed by a first application server and a second application server. The command as executed by the first application server may be associated with user group data having an age range of 5 years while the command as executed by the second application may be associated with user group data having an age range of 2 years.

The server(s) 120 may determine whether exact identities of users may be determined based on thresholds and likelihoods. For example, the thresholds may be measured as low, medium, and high. Some speech processing systems may be configured to update the user group data if a likelihood of determining user identity is medium or lower, while other speech processing system may be configured to update the user group data if the likelihood of determining user identity is low or lower. The server(s) 120 may alternatively determine whether exact identities of users may be determined based on probability scores, or other scores such as confidence scores. In an example, the server(s) 120 may map a first range of probability scores to a low likelihood, a second range of probability scores to a medium likelihood, and a third range of probability scores to a high likelihood. Other thresholding and configurations are also possible.

Figure 6:
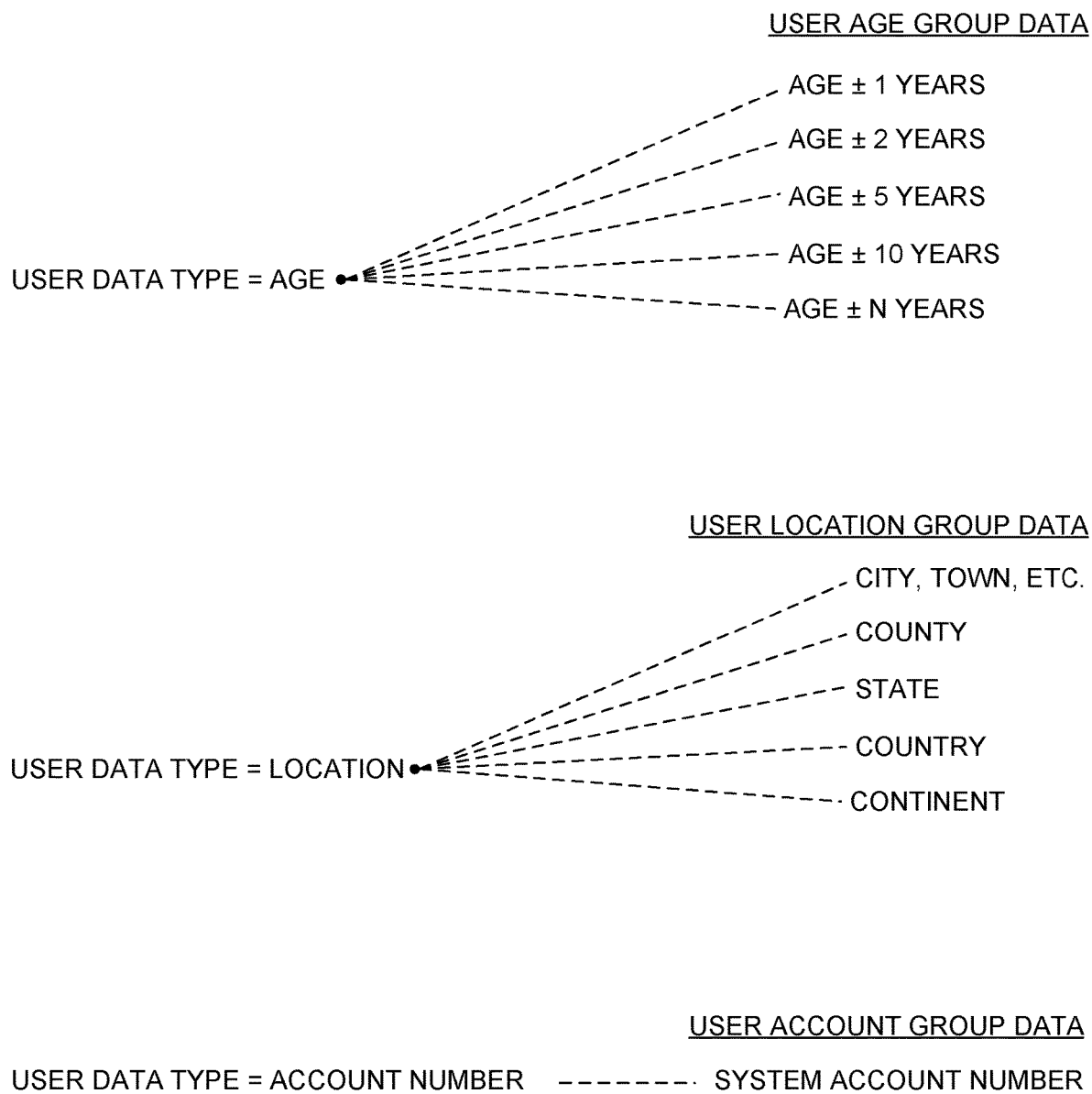
FIG. 6 illustrates the creation of various types of user group data from various types of user data according to embodiments of the present disclosure.

FIG. 6 illustrates the creation of various types of user group data from various types of user data. User data may be organized into different types of personal identification data. For example, user data may include an age user data type that represents an age of the user, a location user data type that represents a location of the user, an account number user data type that represents an account number of the user, as well as others.

The age user data type may represent the exact year age (e.g., 30 years old) of the user. User age group data may represent a range of ages that encompasses the user's age. The user age group data may include an age range that is ±1 year of the user's age, ±2 years of the user's age, ±5 years of the user age, ±10 years of the user's age, ±N years of the user's age. For example, if the age user data type indicates the user is 30 years old, user age group data created therefrom may indicate an age of the user to be 29-31, 28-32, 25-35, 20-40, etc. The specific age range of the user age group data may be configured based on the application server(s) 125 receiving the user age group data, based on user preferences, and/or based on previous interactions with the application server(s) 125 (e.g., a wider range of ages may be used to ensure user anonymity if the user has interacted with the application server(s) 125 over a threshold amount of times).

The location user data type may represent an exact location of the user (or the speech-controlled device with which the user is interacting). The exact location may be as specific as a room of a building, or may be broader depending upon implementation. Regardless of the specificity of the exact location, one skilled in the art should appreciate that the user location group data should include a location broader than the exact location of the user data. For example, the user location group data may indicate a confined geographic location (e.g., city, town, village, etc.), or a more robust geographic area, such as a county, state country, continent, or the like.

The account number user data type may represent an account number of the user. Such account number may be specific to a service provided by a specific application server(s) 125. It should be appreciated that the account number user data type may represent, for a given user, an account number for each service the user is signed up for. User account group data may represent a single account number used by the system 100 with respect to interactions with a single service. For example, the system 100 may communicate with a music streaming application server and a ride sharing application server. The system 100 may have a first account used when interacting with the music streaming application server, and a second account used when interacting with the ride sharing application server. The first account may be used for a variety of users interacting with the music streaming application service, and the second account may be used for a variety of users interacting with the ride sharing application server. This allows the system 100 to reconcile a single system account with an application server for multiple users. The system 100 may the individually reconcile the system account against the individual user's account. This ensures individual users remain anonymous to application servers, while also ensuring that application servers are paid for the services they provide.

For example, during some configuration phase a user may indicate to the system what paid services the user subscribes to, potentially along with user-specific account information so the system can verify the user's accounts with those services. Separately, the system may have a system account number with the service provider where the system account number authorizes the provision of services through the system, but is not necessarily linked by the service provider to a particular user. In response to receiving a request from a user to access content that must be paid for, the system may verify that the user has paid for access to the content, either by checking the user's individual status with the content provider at the time of the request, or checking the user's status ahead of time and storing an indication of the user's status, for example in the user's profile with the user profile storage 402. Upon confirming that the user is authorized to receive the content, the system may request the content from the content source, only the system may do so using the system account number (which does not indicate the requesting user) rather than using the user's specific account information with the content source. The system may also create a transaction identifier for the transaction (which may or may not be shared with the service) that the system can use, for example, to internally reconcile payment information if the content to be access is pay-per-access rather than subscription based. Thus the system may provide pay-per-access content to a user without providing the content source with user specific information such as credit card or payment information, identity information, or the like.

Over time, a user may speak one or more commands invoking a single application server. As the application server is provided with user group data over time, the application server may be able to eventually deduce an exact identity of the user. When this occurs, the user may be prompted to indicate whether it is ok to continue to provide data to the application server that may results in a deduction of the user's exact identity. If the user indicates it is ok to continue sending data to the application server, the speech processing system may keep sending data to the application server. Alternatively, if the user indicates it is not ok to continue sending data to the application server, the speech processing system may determine another application server that is capable of providing content responsive to the command but that is not capable of deducing the identity of the user. FIGS. 7A and 7B illustrate receiving a user directive regarding whether to provide data that may result in a content source determining an exact identity of the user.

The server(s) 120 determines (522) user data for executing the command. The server(s) 120 also determines (702) user group data corresponding to the user data that was previously provided to the content source (i.e., application server 125) invoked by the command. The server(s) 120 may maintain a log or database that include data indicating users. Data indicating a single user may be associated with data indicating application servers invoked by commands spoken by the user. Data indicating a single application server may be associated with data indicating commands executed by the application server. Data indicating a single application server may also indicate the user group data provided to the application server with respect to a particular user. Such user group data may also be associated with data indicating the command with respect to which the user group data was sent.

The server(s) 120 determines (704) whether an identity of the user is deducible by the application server(s) 125 based on previously provided user group data corresponding to the user. The likelihood of the application server(s) 125 determining the identity of the user may be based on a confidence scale or threshold. Thus the determining (704) may comprise the system determining a certain confidence that the application server(s) 125 (or other device(s) associated with the content source) has a certain likelihood of determining the user identity. The confidence scale or threshold may be configurable, thereby allowing different systems to have different tolerances with respect to divulgation of user data or with regard to a particular content source's ability to determine the user identity. For example, if a first certain content source is associated with a second content source (such as if they are both owned by the same parent company) the system may assume that information provided to the first content source is available to the second content source and may thus may accordingly determine/adjust the confidence or likelihood of the user identity being discovered to account for the similarity in ownership. In another example, if the system knows that a certain content source deletes user data after a certain period of expiration, the system may take that into account when determining the confidence or likelihood.

The system may consider what information has previously been provided to the content source when performing the determining (704). That information may include specific items of information, such as user specific data (age, location, address, behavior, accent, physical appearance, image data, etc.), user group data, etc. and may also consider other factors such as timing of user requests, patterns of user behavior, or the like. For example, if the system makes many requests to a content source over a period of time, but one particular request for a user is so different from the other requests, and is repeated with a discernable pattern, the system may determine (704:Yes) that it is likely that the content source may deduce from a further request (such as one fitting the pattern) either the identity of the user, or a link between the previous requests in the pattern and the further request.

If the server(s) 120 determines it is likely or probable that the application server(s) 125 can determine the user's identity, the server(s) 120 sends (706) a signal to the speech-controlled device 110 indicating the user's identity may be determined by the application server(s) 125. The signal may also include a request for the user to indicate it is ok for the server(s) 120 to proceed with providing user group data to the application server(s) 125.

The speech-controlled device 110 outputs (708) audio corresponding to content of the signal. The speech-controlled device 110 thereafter captures (710 illustrated in FIG. 7B) input audio including a spoken utterance, and sends (712) audio data corresponding thereto to the server(s) 120.

The server(s) 120 processes the audio data (e.g., using ASR and NLU), and therefrom determines (714) the spoken utterance corresponds to a command to proceed (i.e., continue to share user group data with the application server(s) 125). Either after the server(s) 120 determines the command to proceed, or if the server(s) 120 determines it is unlikely or improbable that the application server(s) 125 can determine the identity of the user, the server(s) 120 may send (526) user group data and an indication of the originally spoken command to the application server(s) 125.

As detailed above, the server(s) 120 may determine the user spoke a command indicating the server(s) 120 should proceed with providing the application server(s) 125 with user group data. Alternatively, the server(s) 120 may determine (716) the audio data includes a spoken command to not proceed (i.e., to not continue to provide the application server(s) 125 with user group data that may result in the application server(s) 125 determining an identity of the user). In this situation, the server(s) 120 may then determine (718) one or more different application server(s) 125 having access to content responsive to the user's original spoken command, but that are unlikely to determine an identity of the user.

As detailed above, a user may provide the server(s) 120 with a spoken directive not to provide specific application servers 125 with data that may result in identification of the user. Alternatively, the user may provide the server(s) 120 with a spoken directive to proceed, but not provide the application server(s) 125 with data that may result in identification of the user. This is illustrated in FIGS. 8A and 8B.

The server(s) 120 determines (522) user data for executing the command. The server(s) 120 also determines (702) user group data corresponding to the user data that was previously provided to the content source (i.e., application server 125) invoked by the command. The server(s) 120 determines (704) whether an exact identity of the user is deducible by the application server(s) 125 based on previously provided user group data corresponding to the user. If the server(s) 120 determines it is likely or probable that the application server(s) 125 can determine the user's identity, the server(s) 120 sends (706) a signal to the speech-controlled device 110 indicating the user's identity may be determined by the application server(s) 125. The signal may also include a request for the user to indicate it is ok for the server(s) 120 to proceed with providing user group data to the application server(s) 125.

The speech-controlled device 110 outputs (708) audio corresponding to content of the signal. The speech-controlled device 110 thereafter captures (710 illustrated in FIG. 8B) input audio including a spoken utterance, and sends (712) audio data corresponding thereto to the server(s) 120.

The server(s) 120 processes the audio data (e.g., using ASR and NLU), and therefrom determines (802) the spoken utterance corresponds to a command to proceed but not provide data to the application server(s) 125 that would result in identification of the user. The user may provide such a command when the user is ok with receiving non-user customized results in order to maintain the user's identity a secret from the application server(s) 125.

The server(s) 120 then sends (804) command data to the application server(s) 125. The command data may be specific to the originally spoken command, but should not be specific to the user. For example, if the user original said "Play my rock music", the command data may indicate rock music, but may not indicate user specific data (e.g., age, gender, etc.). The application server(s) 125 determines content responsive to the command data, and sends (806) the non-user specific content to the server(s) 120. The server(s) 120 sends (808) the non-user specific content to the speech-controlled device 110, and the speech-controlled device 110 outputs (810) the non-user specific content. According to the example above, the non-user specific content may be rock music associated with various decades.

As detailed above, the server(s) 120 may determine user group data to share with the application server(s) 125 based on data previously provided to the application server(s) 125 that results in responsive content being output by the system. Alternatively, as illustrated in FIG. 9, the server(s) 120 may determine what data to share with the application server(s) 120 based on user preferences.

The server(s) 120 determines (520) a user that spoke the utterance, and therefrom accesses (902) a profile of the user. The server(s) 120 determines (904) data in the profile that is allowed to be shared with the application server(s) 125 that stores or has access to content responsive to the command. The server(s) 120 sends (906) data allowed to be shared to the application server(s) 125. The server(s) 120 may only send data allowed to be shared that is needed for the application server(s) 125 to obtain responsive content. Therefore, the server(s) 120 may send all or a portion of the data in the user profile indicated as being sharable with the application server(s) 125. The application server(s) 125 then sends (528) the responsive content to the server(s) 120.

Speech-controlled devices may be located at a variety of places. For example, a speech-controlled device may be located at a user's home, office, or some other user specific location. According to this example, the server(s) 120 may be able to obtain user specific content since the speech-controlled device is interacted with by a finite number of users (i.e., the user, the user's family members, etc.). Alternatively, a speech-controlled device may not be associated with a specific user and may be located in a public place (e.g., a hotel lobby). Since the speech-controlled device is located in a public place where a multitude of user can interact with the speech-controlled device, the server(s) 120 may not obtain user specific content. FIG. 10 illustrates determining data to share with an application server(s) 125 based on a location of the speech-controlled device.

The server(s) 120 determines (510) a command in input text data. The server(s) 120 may also determine (1004) a geographic location of the speech-controlled device 110, for example by accesses a profile of the speech-controlled device 110 (such as for a stationary device) or by accessing global position system (GPS) or other location data for a mobile device. Based on the geographic location, the server(s) 120 determines (1006) data allowed to be shared with the application server(s) 125. For example, if the speech-controlled device 110 is located at a residential location (e.g., a home), the server(s) 120 may determine the data based on user preferences or past exchanges with the application server(s) 125 as described herein. Alternatively, if the speech-controlled device 110 is located in a public place (e.g., a hotel lobby, a park, etc.), the server(s) 120 may determine the data as simply being that of the command and the location of the speech-controlled device 110. For example, if a user says "play a song" to a speech-controlled device 110 located in a park, the server(s) 120 may determine the data to pass to the application server(s) 125 to be [play a song that may be output in a park]. The server(s) 120 sends (1008) the data to the application server(s) 125 invoked by the command, and the application server(s) 125 provides (528) the server(s) 120 with content responsive to the command.

In some situations, geographic locations may dictate which user specific data can be shared with application servers 125. For example, the types of user sharable user specific data may be dictated by the laws of continents, countries, states, international treaties, etc. By determining what data to share based on a location of the speech-controlled device 110, the server(s) 120 is able to conform with laws affecting data transmissions of the speech-controlled device 110.

In some situations, the server(s) 120 may not provide the application server(s) 125 with user specific data, but the application server(s) 125 may thereafter request user specific data prior to providing the server(s) 120 with content responsive to a command. FIGS. 11A through 11C illustrate the server(s) 120 obtaining a user directive to provide the user specific data to the application server(s) 125.

The speech-controlled device 110 captures (502) input audio corresponding to a spoken utterance, and sends (504) input audio data corresponding thereto to the server(s) 120. The server(s) 120 performs speech processing on the input audio data. For example, the server(s) 120 may perform (506) ASR on the input audio data to create input text data, and may perform (508) NLU on the input text data to generate NLU results. The server(s) 120 may use the NLU results to determine (510) a command in the input text data.

The server(s) 120 determines (512) one or more application servers 125 storing or having access to content responsive to the command. The server(s) 120 sends (1102) data specific to the command, but not the user, to the application server(s) 125. The application server(s) 125 sends (1104) a signal to the server(s) 120 requesting user-specific data. For example, the signal may request the user's employment information. Employment information may be useful if the command relates to a loan, mortgage, or other security backed transaction. The server(s) 120 sends (1106 illustrated in FIG. 11B) a signal to the speech-controlled device 110 requesting an indication of whether the user-specific data can be shared with the application server(s) 125. The signal may also indicate the specific user data requested by the application server(s) 125. This allows the user to make a completely informed decision regarding whether to allow the user's data to be shared.

The speech-controlled device 110 outputs (708) audio corresponding to the signal. The speech-controlled device 110 then captures (710) audio corresponding to a spoken utterance, and sends (712) audio data corresponding thereto to the server(s) 120. The server(s) 120 processes the audio data (i.e., using ASR and NLU processing), and determines (1108) therefrom whether the user-specific data can be shared with the application server(s) 125. If the spoken utterance indicates the user-specific data cannot/should not be shared, the server(s) 120 ceases (1109) processing (e.g., ceases interactions with the application server(s) 125 with respect to the originally spoken command). Alternatively, if the spoken utterance indicates the user-specific data can be shared, the server(s) 120 determines (1116 illustrated in FIG. 11C) a user that spoken the utterance responsive to the signal. By determining the user that spoke the utterance responsive to the signal, and not the user that spoke the original command, the server(s) 120 may prevent unintentional disclosure of user data. For example, a first user may speak the original command, and a second user may speak a response to the signal. If the user that spoke the original command was determined, the server(s) 120 would disclose user data that was not authorized to be shared. Based on the user, the server(s) 120 determines (1118) user data that is responsive to the user data requested by the application server(s) 125. The user may determine the user data from the profile of the user.

If the server(s) 120 is unable to determine the user data in the profile, the server(s) 120 may send a signal to the speech-controlled device 110 requesting the user speak the user data. The speech-controlled device 110 may capture audio corresponding to spoken user data, and may send audio data corresponding thereto to the server(s) 120. The server(s) 120 may store the spoken user data in the profile for future user (i.e., future interactions with one or more application server(s) 125).

The server(s) 120 sends (1110) the user data to the application server(s) 125. The application server(s) 125 sends (528) content responsive to the original command, and tailored based on the user data, to the server(s) 120. The server(s) 120 sends (530) the content to the speech-controlled device 110, and the speech-controlled device 110 outputs (532) audio corresponding to the content.

Figure 12:
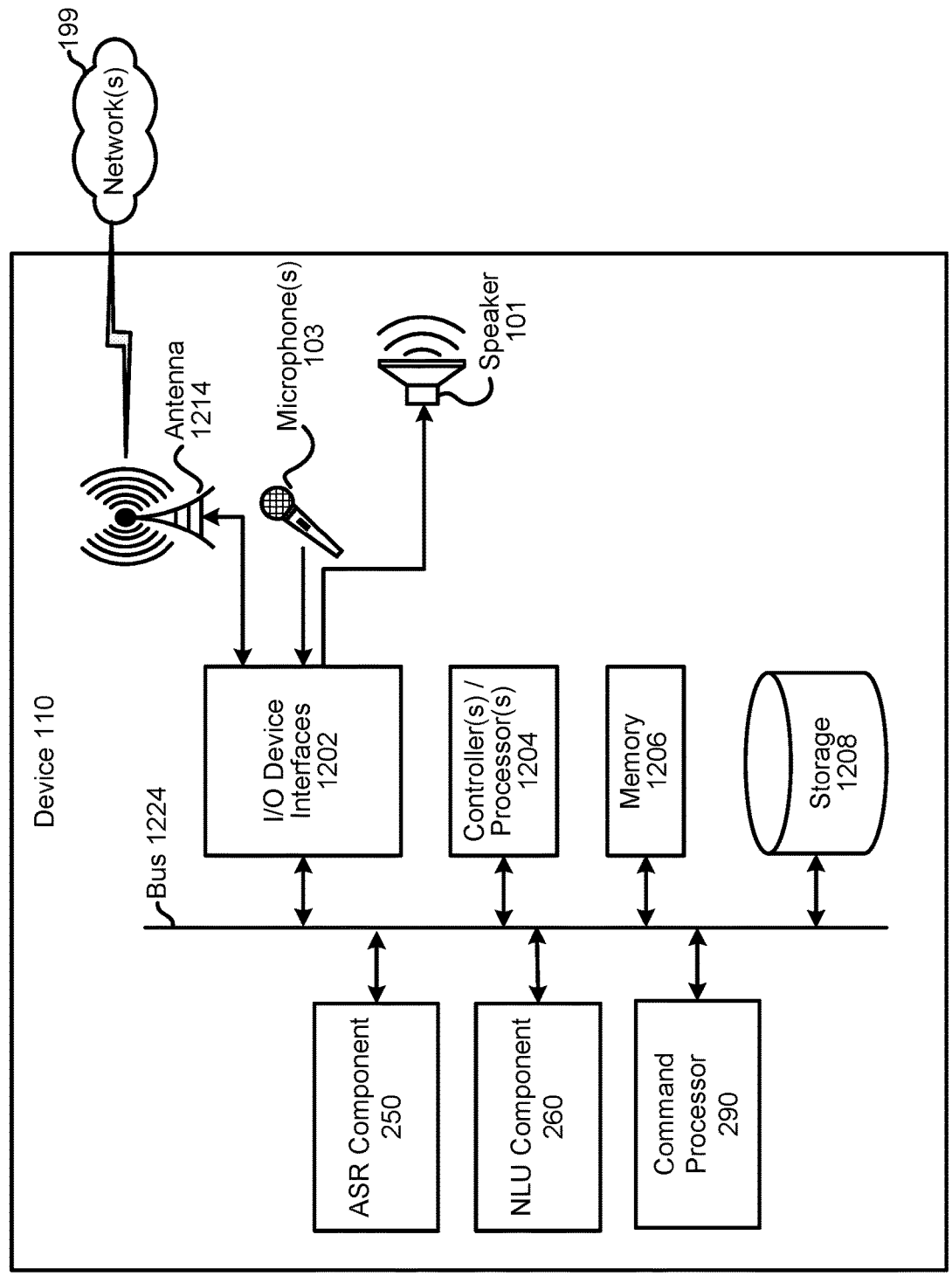
FIG. 12 is a block diagram conceptually illustrating example components of a device according to embodiments of the present disclosure.
Figure 13:
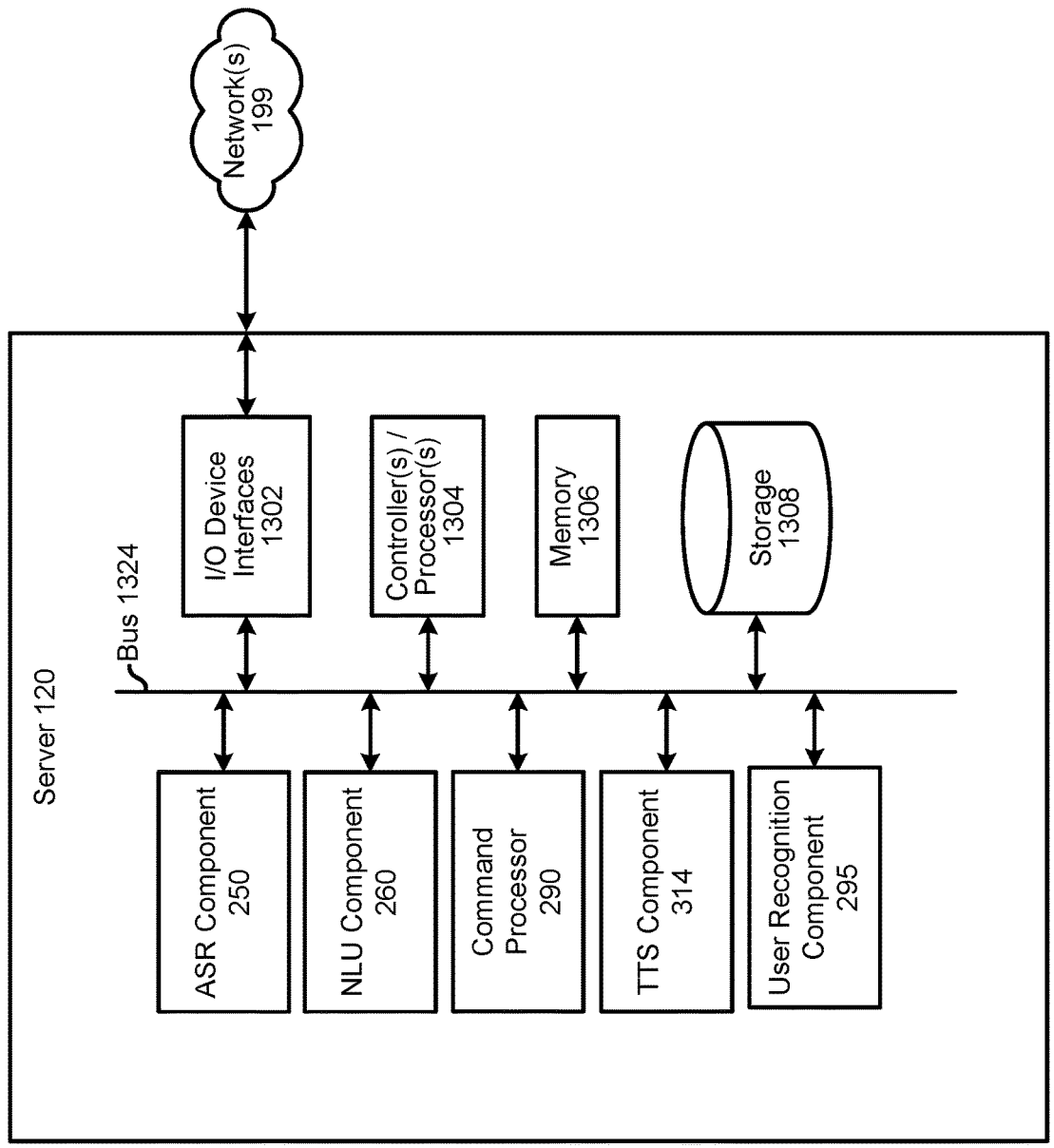
FIG. 13 is a block diagram conceptually illustrating example components of a server according to embodiments of the present disclosure.

FIG. 12 is a block diagram conceptually illustrating a user device (e.g., the speech-controlled device 110 described herein) that may be used with the described system. FIG. 13 is a block diagram conceptually illustrating example components of a remote device, such as the server(s) 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1204/1304), that may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive (MRAM) and/or other types of memory. Each device (110/120) may also include a data storage component (1208/1308), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1202/1302).

Computer instructions for operating each device (110/120) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120) includes input/output device interfaces (1202/1302). A variety of components may be connected through the input/output device interfaces (1202/1302), as will be discussed further below. Additionally, each device (110/120) may include an address/data bus (1224/1324) for conveying data among components of the respective device. Each component within a device (110/120) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 101, a wired headset or a wireless headset (not illustrated), or other component capable of outputting audio. The device 110 may also include an audio capture component. The audio capture component may be, for example, a microphone 103 or array of microphones, a wired headset or a wireless headset (not illustrated), etc. If an array of microphones is included, approximate distance to a sound's point of origin may be determined by acoustic localization based on time and amplitude differences between sounds captured by different microphones of the array.

For example, via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or the server 120 may include an ASR component 250. The ASR component 250 in the device 110 may be of limited or extended capabilities. The ASR component 250 may include the language models 254 stored in ASR model storage component 252. If limited speech recognition is included, the ASR component 250 may be configured to identify a limited number of words, whereas extended speech recognition may be configured to recognize a much larger range of words.

The device 110 and/or the server 120 may include a limited or extended NLU component 260. The NLU component 260 in the device 110 may be of limited or extended capabilities. The NLU component 260 may comprise the name entity recognition component 262, the intent classification component 264, and/or other components. The NLU component 260 may also include a stored knowledge base and/or entity library, or those storages may be separately located.

The device 110 and/or the server 120 may also include the command processor 290 configured to execute commands/functions associated with a spoken utterance as described herein.

To determine the user that spoke a command/utterance, the server(s) 120 may be configured with the user recognition component 295 described in detail herein above.

To create output speech, the server(s) 120 may be configured with the TTS component 314 described in detail herein above.

As noted above, multiple devices may be employed in a single speech processing system. In such a multi-device system, each of the devices may include different components for performing different aspects of the speech processing. The multiple devices may include overlapping components. The components of the device 110 and the server(s) 120, as illustrated in FIGS. 12 and 13, are exemplary, and may be located as a stand-alone device or may be included, in whole or in part, as a component of a larger device or system.

Figure 14:
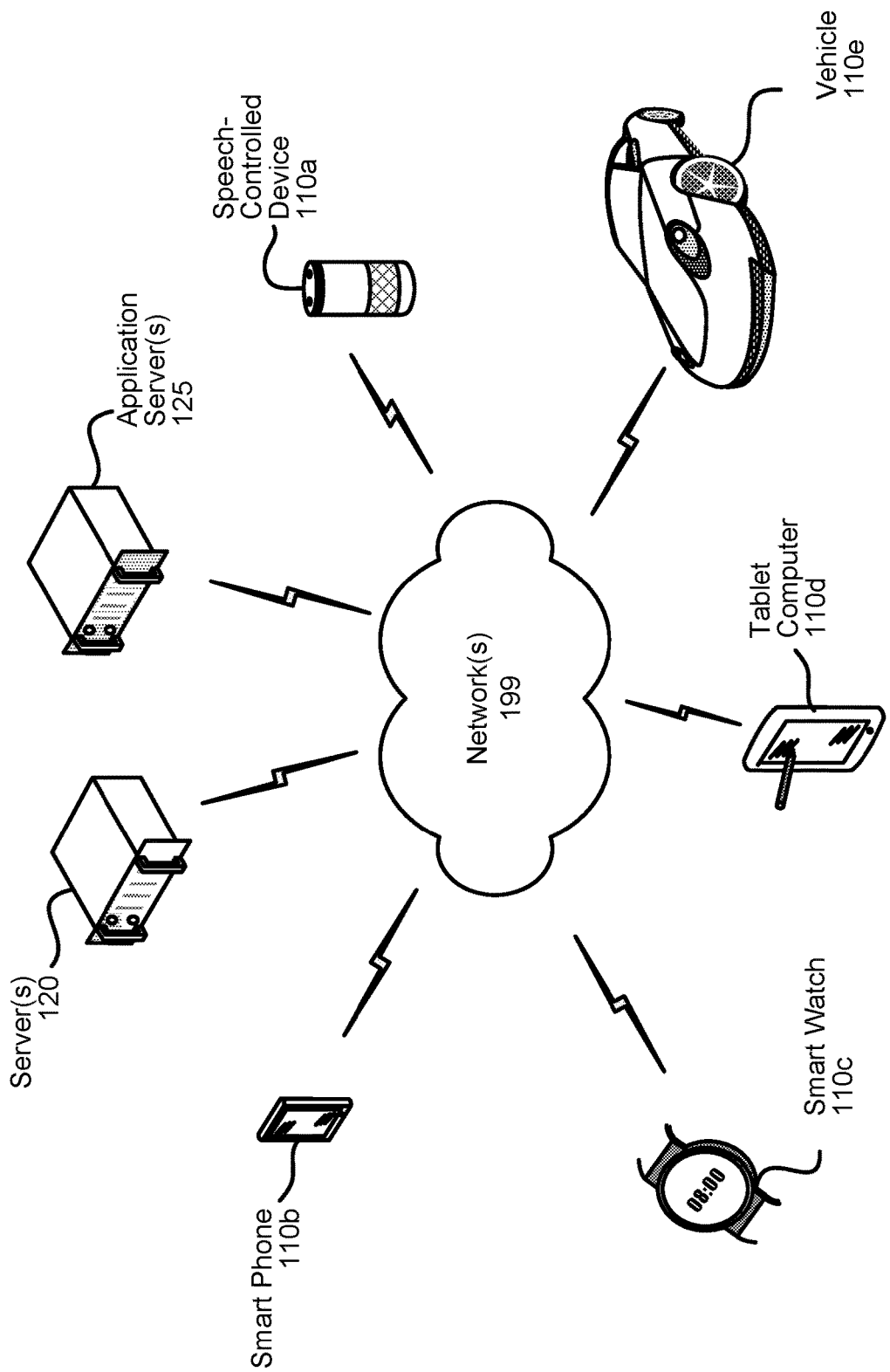
FIG. 14 illustrates an example of a computer network for use with the system.

As illustrated in FIG. 14, multiple devices (120, 125, 110a-110e) may contain components of the system 100 and the devices may be connected over a network(s) 199. The network(s) 199 may include a local or private network or may include a wide network such as the Internet. Devices may be connected to the network(s) 199 through either wired or wireless connections. For example, the speech-controlled device 110a, a smart phone 110b, a smart watch 110c, a tablet computer 110d, and/or a vehicle 110e may be connected to the network(s) 199 through a wireless service provider, over a WiFi or cellular network connection, or the like. Other devices are included as network-connected support devices, such as the server(s) 120, application developer devices (e.g., the application server(s) 125), or others. The support devices may connect to the network(s) 199 through a wired connection or wireless connection. Networked devices may capture audio using one-or-more built-in or connected microphones 103 or audio capture devices, with processing performed by ASR, NLU, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the components and engines may be implemented as in firmware or hardware, such as the AFE 256, which comprises, among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a speech-controlled device, input audio data corresponding to an utterance;
performing speech processing on the input audio data to determine a command;
determining a remote device having access to content responsive to the command;
receiving, from the remote device, a request for user information to provide the content, the user information including age information and geographic information;
identifying a user profile associated with the utterance;
determining, based on age information associated with the user profile, an age of a user associated with the user profile;
determining, based on location information associated with the user profile, a geographic location of the speech-controlled device;
determining an age range encompassing the age;
determining a geographic area encompassing the geographic location;
determining an intent for the remote device to process the request;
determining stored data corresponding to prior user data associated with the user profile, the prior user data previously provided to the remote device;
determining a likelihood that an identity of the user is determinable using the stored data, the age range, and the geographic area;
determining the likelihood satisfies a condition;
in response to determining the likelihood satisfies the condition, sending, to the speech-controlled device, a signal soliciting a confirmation to send the age range and the geographic area to the remote device;
sending, to the remote device, output data indicating the age range and the geographic area to obscure the age of the user and the geographic location;
receiving, from the remote device, output content; and
causing the speech-controlled device to emit the output content.

2. The computer-implemented method of claim 1, further comprising:
receiving, from the speech-controlled device, second input audio data corresponding to a second utterance;
performing speech processing on the second input audio data to determine a second command;
determining that the remote device has access to further content responsive to the second command;
receiving, from the remote device, a second request for further user information to provide the further content, the further user information including employment information;
determining a likelihood that the identity of the user can be determined using the request, the age range, the geographic area, and the employment information;
determining that the likelihood is above a likelihood threshold; and
sending, to the speech-controlled device, a second signal soliciting a second confirmation to send the employment information to the remote device.

3. The computer-implemented method of claim 2, further comprising:
receiving, from the speech-controlled device, third input audio data corresponding to a third utterance;
performing speech processing on the third input audio data to determine a third command to refrain from sending the employment information to the remote device;
determining, based on the second command, a second remote device having access to the further content; and
sending, to the second remote device, a second request for the further content.

4. The computer-implemented method of claim 1, further comprising:
receiving, from the speech-controlled device, second input audio data corresponding to a second utterance;
performing speech processing on the second input audio data to determine a second command;
determining that the remote device has access to further content responsive to the second command;
identifying a plurality of previous commands for content from the remote device, the plurality of previous commands associated with the user profile;
determining that a likelihood that a pattern of behavior can be determined from the plurality of previous commands and the second command;
determining that the likelihood is above a likelihood threshold; and
sending, to the speech-controlled device, a second signal soliciting a second confirmation to request the further content from the remote device.

5. A system comprising:
at least one processor; and
memory including instructions that, when executed by the at least one processor, cause the system to:
receive a request for content to be sent to a first device, the request corresponding to a first user profile;

determine at least one remote device having access to content responsive to the request;

determine a first type of data to be sent to the at least one remote device to access the content;

determine, using the first user profile, user data corresponding to the first type;

determine stored data corresponding to prior user data associated with the first user profile, the prior user data previously provided to the at least one remote device;

determine user group data representing a first characteristic of the user data;

determine, based at least in part on the user group data and the stored data, that the user data is determinable by the at least one remote device using the user group data;

after determining that the user data is determinable by the at least one remote device using the user group data, cause an output corresponding to the user data being determinable by the at least one remote device using the user group data;

after causing the output, receive an indication to refrain from providing the at least one remote device with the user group data;

determine second user group data representing a second characteristic of the user data;

after receiving the indication, determine, based at least in part on the second user group data and the stored data, that the user data is to be obscured from the at least one remote device; and after determining that the user data is to be obscured from the at least one remote device, send, to the at least one remote device, the second user group data to enable the content to be sent to the first device.

6. The system of claim 5, wherein the instructions further cause the system to:

receive a second request for further content;

determine the at least one remote device has access to the further content;

determine a second type of data to be provided to the at least one remote device to access the further content;

determine second user data corresponding to the second type;

determine a likelihood that an identity of a user can be determined using the user group data and the second user data;

determine the likelihood is above a likelihood threshold; and cause a first device to solicit a confirmation to provide the at least one remote device with the second user data.

7. The system of claim 6, wherein the instructions further cause the system to:

receive, from the first device, a third indication to refrain from providing the at least one remote device with the second user data;

determine a second remote device having access to the further content; and send, to the second remote device and not the at least one remote device, the second user data.

8. The system of claim 6, wherein the instructions further cause the system to:

receive, from the first device, a third indication to refrain from providing the at least one remote device with the second user data; and send, to the at least one remote device, data representing the second request and not the second user data.

9. The system of claim 5, wherein the instructions further cause the system to:

receive, from the at least one remote device, a second request for second user data corresponding to a second type of user data;

cause a first device to solicit a third indication that the second user data can be provided to the at least one remote device;

receive, from the first device, the third indication to provide the second user data to the at least one remote device;

determine the second user data; and send, to the at least one remote device, the second user data.

10. The system of claim 5, wherein the instructions further cause the system to:

receive, from the at least one remote device, a second request for second user data corresponding to a second type of user data;

cause a first device to solicit a third indication that the second user data can be provided to the at least one remote device;

receive, from the first device, the third indication to provide the second user data to a second remote device;

determine, based on a second user profile associated with the second request, that second data is needed;

cause the first device to solicit the second user data;

receive, from the first device, responsive data corresponding to the second user data;

process the responsive data to determine the second user data; and send, to the second remote device, the second user data.

11. The system of claim 5, wherein:

the user data includes at least one of an age of a user or a geographic location of the user; and the user group data includes at least one of an age range encompassing the age of the user or a geographic area encompassing the geographic location of the user.

12. The system of claim 5, wherein the instructions further cause the system to:

receive a second request for further content;

determine the at least one remote device has access to the further content;

determine a second type of data to be provided to the at least one remote device to access the further content;

identify a plurality of previous requests for content from the at least one remote device, the plurality of previous requests associated with a user profile;

determine that a likelihood that a pattern of behavior can be determined from the plurality of previous requests and the second request;

determine that the likelihood is above a likelihood threshold; and send, to a device associated with the second request, a signal soliciting a confirmation to request the further content from the at least one remote device.

13. A computer-implemented method comprising:

receiving a request for content to be sent to a first device, the request corresponding to a first user profile;

determining at least one remote device having access to content responsive to the request;

determining a first type of data to be sent to the at least one remote device to access the content;

determining, using the first user profile, user data corresponding to the first type;

determining stored data corresponding to prior user data associated with the first user profile, the prior user data previously provided to the at least one remote device;

determining user group data representing a first characteristic of the user data;

determining, based at least in part on the user group data and the stored data, that the user data is determinable by the at least one remote device using the user group data;

after determining that the user data is determinable by the at least one remote device using the user group data, causing an output corresponding to the user data being determinable by the at least one remote device using the user group data;

after causing the output, receiving an indication to refrain from providing the at least one remote device with the user group data;

determining second user group data representing a second characteristics of the user data;

after receiving the indication, determining, based at least in part on the second user group data and the stored data, that the user data is to be obscured from the at least one remote device; and after determining that the user data is to be obscured from the at least one remote device, sending, to the at least one remote device, the user group data to enable the content to be sent to the first device.

14. The computer-implemented method of claim 13, further comprising:

receiving a second request for further content;

determining the at least one remote device has access to the further content;

determining a second type of data to be provided to the at least one remote device to access the further content;

determining second user data corresponding to the second type;

determining a likelihood that an identity of a user can be determined using the user group data and the second user data;

determining the likelihood is above a likelihood threshold; and causing a first device to solicit a confirmation to provide the at least one remote device with the second user data.

15. The computer-implemented method of claim 14, further comprising:

receiving, from the first device a third indication to refrain from providing the at least one remote device with the second user data;

determining a second remote device having access to the further content; and sending, to the second remote device and not the at least one remote device, the second user data.

16. The computer-implemented method of claim 14, further comprising:

receiving, from the first device, a third indication to refrain from providing the at least one remote device with the second user data; and sending, to the at least one remote device, data representing the second request and not the second user data.

17. The computer-implemented method of claim 13, further comprising:

receiving, from the at least one remote device, a second request for second user data corresponding to a second type of user data;

causing a first device to solicit a third indication that the second user data can be provided to the at least one remote device;

receiving, from the first device the third indication to provide the second user data to the at least one remote device;

determining the second user data; and sending, to the at least one remote device, the second user data.

18. The computer-implemented method of claim 13, further comprising:

receiving, from the at least one remote device, a second request for second user data corresponding to a second type of user data;

causing a first device to solicit a third indication that the second user data can be provided to the at least one remote device;

receiving, from the first device, the third indication to provide the second user data to the at least one remote device;

determining, based on a second user profile associated with the second request, that second data is needed;

causing the first device to solicit the second user data;

receiving, from the first device, responsive data corresponding to the second user data;

processing the responsive data to determine the second user data; and sending, to the at least one remote device, the second user data.

19. The computer-implemented method of claim 13, further comprising:

determining the user data corresponds to at least one of an age of a user or a geographic location of the user; and determining the user group data including at least one of an age range encompassing the age of the user or a geographic area encompassing the geographic location of the user.

20. The computer-implemented method of claim 13, further comprising:

receiving a second request for further content;

determining the at least one remote device has access to the further content;

determining a second type of data to be provided to the at least one remote device to access the further content;

identifying a plurality of previous requests for content from the at least one remote device, the plurality of previous requests associated with the user profile;

determining that a likelihood that a pattern of behavior can be determined from the plurality of previous requests and the second request;

determining that the likelihood is above a likelihood threshold; and sending, to a device associated with the second request, a signal soliciting a confirmation to request the further content from the at least one remote device.

* * * * *